US012717889B2

(12) United States Patent
Pedro Perez Grande et al.

(10) Patent No.: US 12,717,889 B2
(45) Date of Patent: Aug. 25, 2026

(54) MUTUAL AUTHENTICATION SYSTEM AND METHOD

(71) Applicant: Pedro Perez Grande Pedro Perez Grande, Veguellina de Orbigo (ES)

(72) Inventors: Pedro Perez Grande Pedro Perez Grande, Veguellina de Orbigo (ES); Adriana Remedios Suarez Corona, Leon (ES)

(73) Assignee: Pedro Perez Grande Pedro Perez Grande, Veguellina de Orbigo (ES)

( * ) Notice: Subject to any disclaimer, the term of this patent is extended or adjusted under 35 U.S.C. 154(b) by 0 days.

(21) Appl. No.: 18/704,470

(22) PCT Filed: Oct. 24, 2022

(86) PCT No.: PCT/ES2022/070690
§ 371 (c)(1),
(2) Date: Apr. 25, 2024

(87) PCT Pub. No.: WO2023/073267
PCT Pub. Date: May 4, 2023

(65) Prior Publication Data

US 2024/0386090 A1 Nov. 21, 2024

(30) Foreign Application Priority Data

Oct. 26, 2021 (ES) ............................... ES202131005

(51) Int. Cl.
*G06F 21/36* (2013.01)
*G06F 3/04886* (2022.01)

(52) U.S. Cl.
CPC .......... *G06F 21/36* (2013.01); *G06F 3/04886* (2013.01)

(58) Field of Classification Search
CPC ...... G06F 21/36; G06F 3/04886; G06F 3/041; H04L 2463/082; H04L 63/12; H04W 12/06
See application file for complete search history.

(56) References Cited

U.S. PATENT DOCUMENTS 8,392,975 B1 3/2013 Raghunath
2011/0314529 A1 12/2011 Bailey, Jr.
(Continued)

OTHER PUBLICATIONS

Martin Mihajlov et al: “ImagePass—Designing graphical authentication for security” Next Generation Web Services Practices (NWESP), 2011 7th International Conference ON, IEEE, Oct. 19, 2011 (Oct. 19, 2011), pp. 262-267, XP032028121, DOI: 10.1109/NWESP.2011.6088188 ISNB: 978-1-4577-1125-1 the whole document.
(Continued)

*Primary Examiner* — Hany S. Gadalla
(74) *Attorney, Agent, or Firm* — SOROKER NORDMAN RIBA; Daniel Schatz

(57) ABSTRACT

Method and system for mutual authentication. The system comprises:

a virtual keyboard generation unit (210) for obtaining (110) a keyboard configuration (112) of a user (201), including graphical features (114), arrangements (116) and keyboard generation rules (118); and generating (120) a virtual keyboard (212) formed by keys (214) with combination of graphics features (114) in certain arrangements (116) based on the keyboard generation rules (118);

an input interface (230) for receiving (140) a key selection (144) of the virtual keyboard (212);

an authentication unit (240) for applying (160) user authentication rules (152) on the virtual keyboard (212), obtaining at least one correct key sequence (Continued)

(162), and authenticating (170) to the user (201) if the key selection (144) is validated with respect to a correct key sequence (162).

25 Claims, 11 Drawing Sheets

(56) References Cited

U.S. PATENT DOCUMENTS

| | | | | |
|---|---|---|---|---|
| 2015/0100913 | A1* | 4/2015 | Park ...................... | G06F 3/0238 715/773 |
| 2020/0104475 | A1 | 4/2020 | Guionneau | |

OTHER PUBLICATIONS

Joshi Abhilash M et al: "Authentication using Text and Graphical Password", 2018 International Conference on Advances in Computing, Communications and Informatics (ICACCI), IEEE, Sep. 19, 2018 (Sep. 19, 2018), pp. 381-386, XP033460830, DOI: 10.1109/ICACCI.2018.8554390 [retrieved on Nov. 30, 2018] the whole document.

* cited by examiner

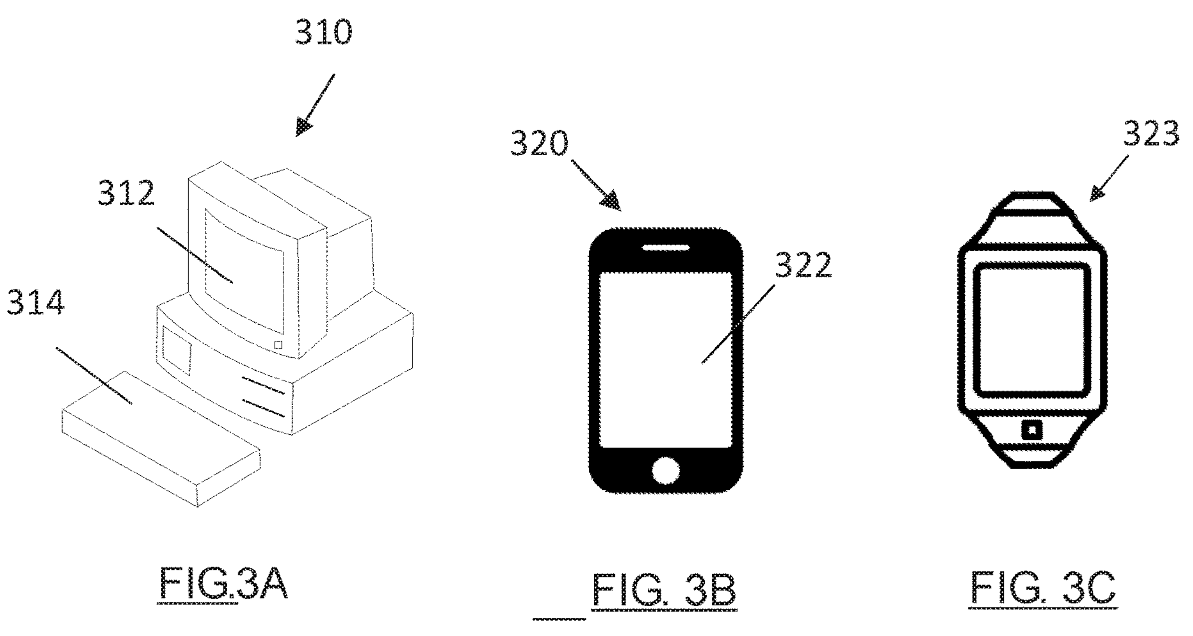
FIG.3A
FIG. 3B
FIG. 3C
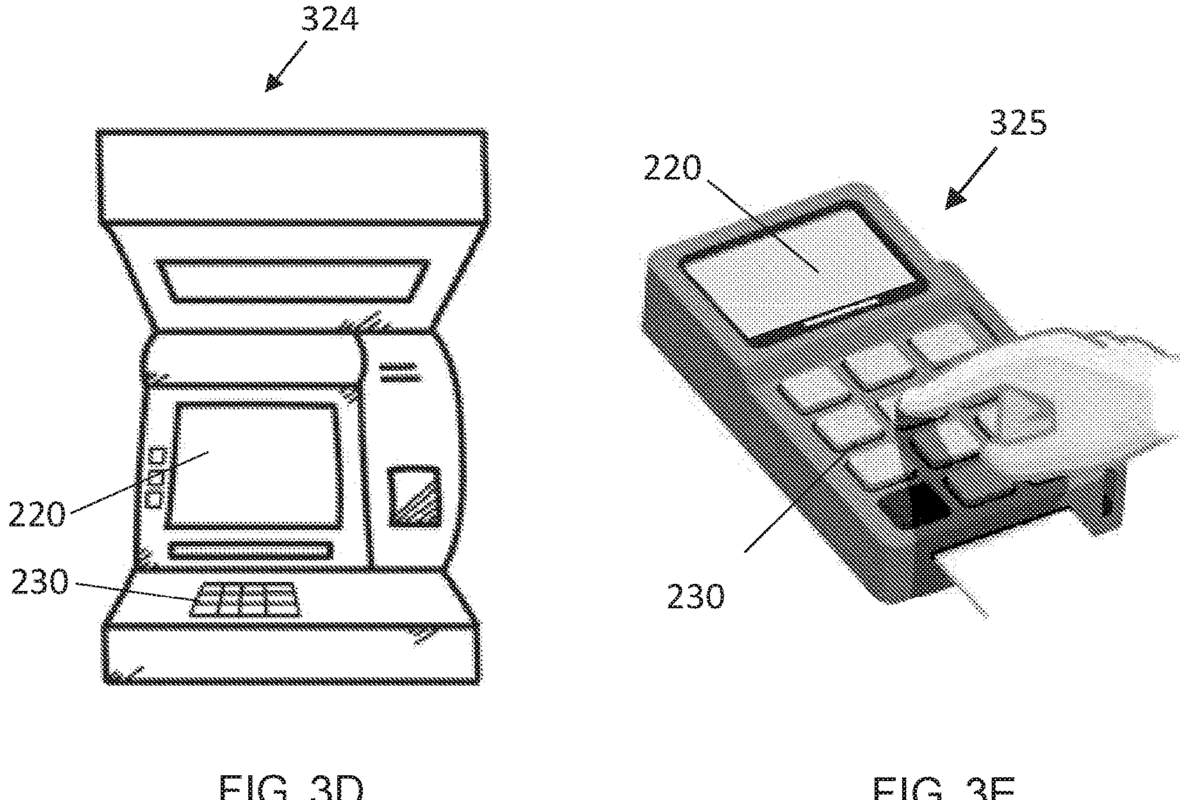
FIG. 3D
FIG. 3E

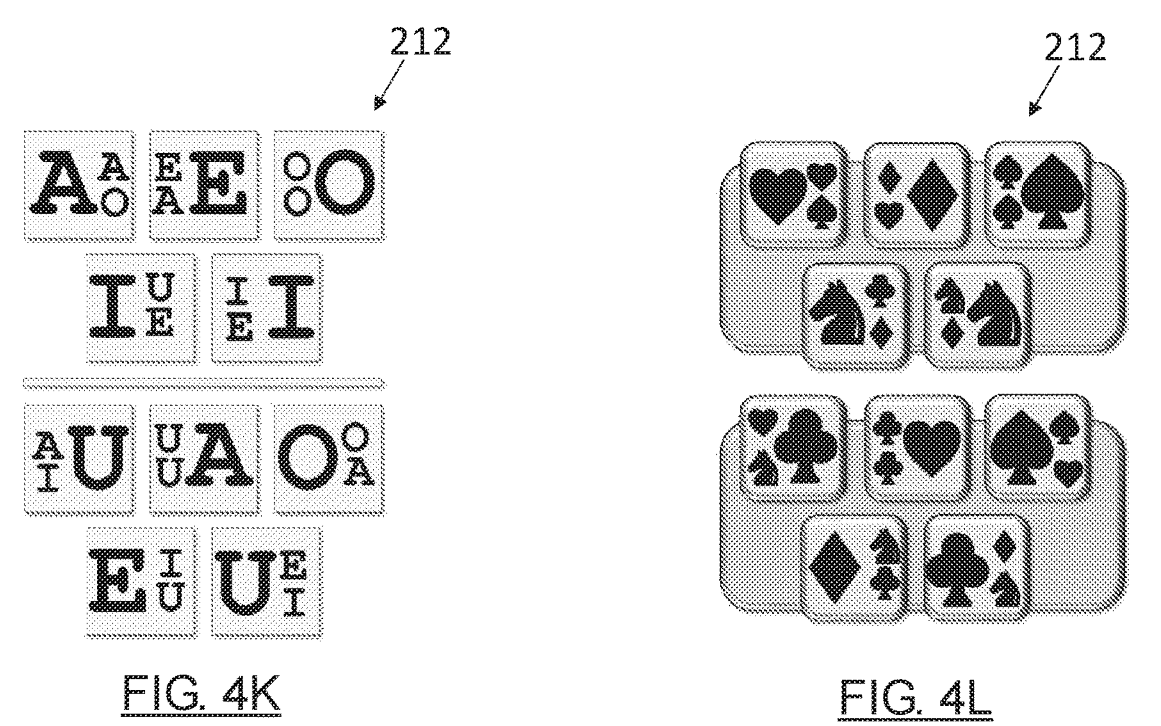
FIG. 4K
FIG. 4L
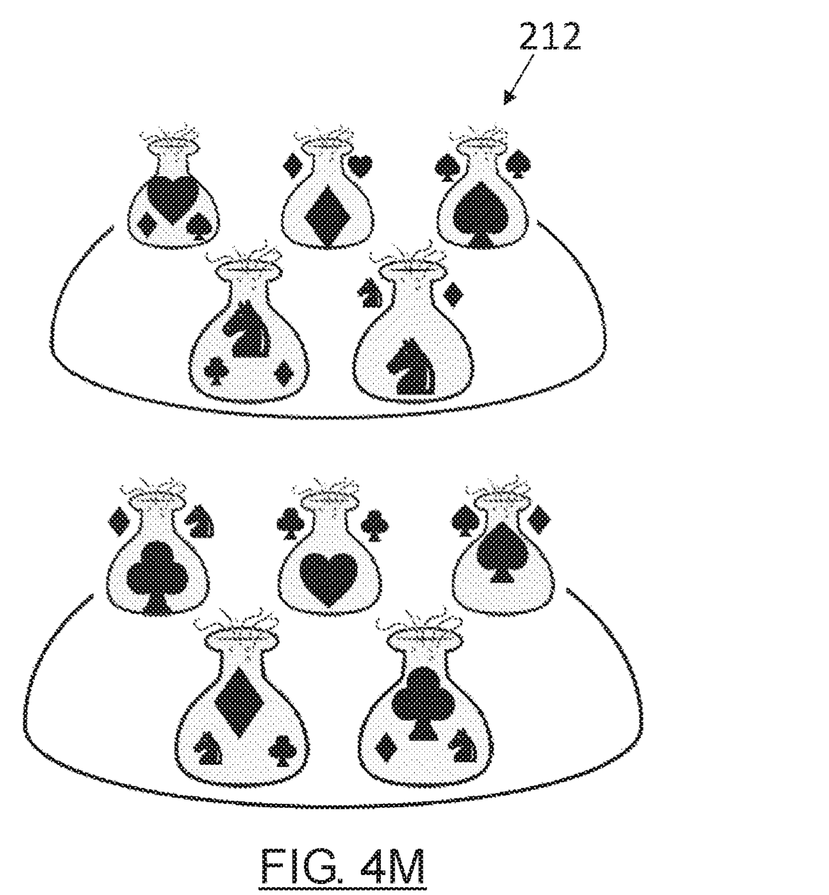
FIG. 4M

MUTUAL AUTHENTICATION SYSTEM AND METHOD

FIELD OF THE INVENTION

The invention relates generally to the security access sector to networks and to computers; and more specifically, to the sector of human user authentication systems against machines, servers, or all types of electronic devices without using biometric aspects of the user, and without dependence on external objects or elements.

BACKGROUND OF THE INVENTION

The methods for authenticating human users implemented by computer systems or electronic devices, wherein a user confirms its identity to be able to perform some action in a generally electronic system, are primarily based on identification methods by the system (fingerprint, facial image), and/or in the sharing of secrets between the user and the authentication system (passwords, pins, etc.), thus being dangerous, among other many, for two crucial reasons:

regarding methods based on identification: the user does not necessarily show the desire to authenticate.

the secrets are easily copied and impersonated, and their storage and management are complicated from a point of view of information leaks.

Other authentication systems, such as based on external devices (tokens, cryptographic keys, single-use key generators, SMS, etc.) require complex installations, high costs in devices, and complex authentication schemes, among others drawbacks.

The state of the art of existing inventions not relying on external elements or biometrics is monopolized by the use of passwords, forcing the user to memorize complicated sequences of numbers, letters and symbols, which should be unique for each service requiring an authentication. The amount of services of this type that we use daily makes the ability of the human brain to be overflowed, so users get to use password managers (an external element dependency) or centralized authentication processes (using authentication of a provider to use other services); those practices carry a series of intrinsic risks and privacy problems. There are some alternatives to the passwords which emphasize their visual usability and appeal, although they are very limited in use, being at a commercial level substantially limited to the Android unlock patterns and the choice of points determined in an image (concept introduced by Windows 8 under the name of "Picture Password").

The present invention describes a new authentication system, based on a series of cognitive processes known only by the user (cognitive capabilities of inference, recognition, transformation, calculation and automation of mental processes), so that it is easily adaptable to current electronic systems without incurring in important costs, is easy to use for the user and it is resistant to being copied or impersonated. Regarding to authentication methods using Android unlock patterns or the choice of points determined in an image, the method of the present invention achieves to achieve similar levels of usability, with very superior security levels.

The proposed method uses simple cognitive mechanisms, adapted to each user (precisely, to be chosen by him depending on his capabilities and the desired level of security), mechanisms which will undergo an automation process, making it faster and safer authentication, and making the sharing of the secret difficult. It also provides conscious authentication (a user cannot be authenticated without desire to do so) and mutual authentication (the user unequivocally identifies the service where to be authenticated). The proposed method is superior to existing methods because is resistant not only to viewing attacks (an attacker observes the user authenticated) but also to recording attacks (an attacker has the chance to record various authentication sessions), and presents an upper level of defence upon phishing attacks.

DESCRIPTION OF THE INVENTION

The present invention relates to a system and a mutual authentication method. The invention is based on a human user authentication mechanism against electronic devices based on one or more images, typically represented on a screen, where the images show a sort of keyboard whose keys or pieces have different graphical features, and where the user through a series of stored rules is able to provide the system a correct result that allows it to be authenticated.

The nature of the process (the calculation of the result) to be performed by the user in the authentication process makes the mechanism safe for attacks not only of observation, but even recording. The dynamic nature of the result and the large combination of possibilities allows the user to use the same process for various systems without affecting the security.

The graphical nature, and the mechanicalness of the calculations and the steps that the user is to perform, make the process complicated to be shared to a third party (preventing unsafe sharing) at the same time that after a brief training: easy, fast, and usable for the user.

Regarding to other authentication methods, it provides much greater security than numeric-pins and passwords, without reliance on external elements, nor does the need for high implementation costs (such as biometry, location, single-use keys). Likewise, by not requiring any biometric data, it is totally anonymous, and respectful with the treatment of identifying data.

As being a horizontal solution, possible applications are innumerable, it can be used in any scenario where it is possible to use a pin or password, without presenting the security problems of these, either in purely digital environments (e.g PC, mobile device), physical (e.g security entry door to a building), virtual (e.g within a role of role) or even in mixed environments (e.g augmented reality glasses on a touch surface or generic keyboard).

The present invention features a method and system for enabling authentication of a user in an electronic system (computer, sales terminal, web page, mobile device, public computer, ATM, etc.) via a single interface and using cognitive capabilities of the user as an authentication process.

For this purpose, the authentication system shows the user with a sort of a keyboard (referred to as a virtual keyboard or body), of reduced dimensions (e.g, a rectangular array of 2 by 5 elements), where each of the elements that make up (called keys or parts) presents various modifications of a set of symbols or graphic features with different arrangements and rules known to the user.

The user observes the virtual keyboard and firstly he is able to deduce if the keyboard is authentic. The user then chooses a sequence of keys dependent on a sequence of transformations over the displayed virtual keyboard, including external elements in the computation of this sequence.

The system has the ability to check whether the entered sequence is correct and thus validate the user's desire to authenticate to the system. The system can repeat this process in order to improve the user's truthfulness estimation, either showing a particular number of iterations at the beginning of authentication, or after some time, revalidating therefore the user.

A first aspect of the present invention relates to a mutual authentication method, comprising the following steps:

- Obtaining a keyboard configuration of a user to be authenticated, wherein the keyboard configuration includes a plurality of graphical features, a plurality of variations or dispositions of those graphic features, and a set of keypad generation rules.
- Generating at least one virtual keyboard, where each virtual keyboard is formed by a plurality of keys incorporating a combination of graphic features arranged in certain arrangements, wherein the graphical features and arrangements used in each key are selected from the user keypad configuration based on the keyboard generation rules.
- Display to the user to be authenticated, at least one virtual keyboard.
- Receiving a user input corresponding to a key selection of each virtual keyboard. The user input may be expected to be received at a given maximum time since the at least one virtual keyboard is displayed. The key selection of each virtual keyboard may comprise any one or more keys. For example, if four virtual keyboards are shown the user input may consist of the selection of a key of each virtual keyboard, or the selection of two keys of the second and fourth virtual keyboards.
- Obtaining user authentication rules. The keyboard configuration and user authentication rules may be stored in the same entity or device (e.g, memory, databases), or in different devices/entities.
- Applying the user authentication rules on the at least one virtual keyboard to obtain at least one correct key sequence.
- Authenticating the user if the user input key selection is validated in regard to a correct key sequence. An example of a validation function is the exact match (in this case a key selection is validated when matching a correct key sequence), but other validation functions may also be employed, such as the hash resulting from concatenating both sequences is a given sequence.

A second aspect of the present invention relates to the mutual authentication system, comprising a series of elements configured to perform the mutual authentication method. The system comprises a virtual keyboard generation unit, an input interface, an authentication unit and, optionally, an information representation device configured to display the at least one virtual keyboard and which may comprise, for example, one or more screens or a projector to display the virtual keyboards to the user.

A third aspect of the present invention relates to a non-transitory computer-readable storage medium comprising program instructions stored thereon that, when executed on a processor, cause the processor to perform the mutual authentication method.

As the symbols and rules are chosen previously by the user, this represents a protection against spoofing attacks ("spoofing" and "phishing"). Since the combination of these symbols and rules is very numerous, and the final selection of the very particular user (may be as particular as choosing two keys among the ten available) this represents a protection against attacks such as recording, looking above the shoulder ("shoulder surfing"), guessing attacks, etc. Since the process of generating the virtual keyboards and the checking of the user input sequence may be distributed among different computer systems, and applied cryptography techniques, this represents a protection to information leaks, data theft, third party dependencies, etc. Since the calculation (inference process) of the correct sequence by the user is made entirely mental and uses cognitive processes such as automation, this represents protection against the theft of the secret, non-intentional disclosure, resistance to coercion, and the prevention of unsafe configurations.

The present invention can be used in numerous scenarios where an authentication system is required and a dynamic capability of generating the corresponding virtual keyboard graphics is possible, being ideal for electronic systems containing screens, such as personal computers, terminals of public usage, automatic teller machines, etc. The secure character of this mechanism against viewing and recording attacks, makes the introduction of the result unnecessary to be performed in a protected way (e.g, concealing with the other hand the introduction of the PIN into a payment terminal), thus being ideal for this type of environments.

Unlike other more technically complex systems, the proposal presented herein allows easy adoption and integration with existing solutions by not requiring complex developments or substantial changes in systems in order to be updated. The measures expected in terms of usability and acceptability by users allow this method to be establish as a new standard by replacing the current PIN and password applications.

By introducing a new authentication mechanism: something that the user is able to resolve, this method can be considered as second effective authentication factor for platforms such as payment processes, fulfilling the new legal requirements, and can replace more expensive and complex mechanisms such as voice recognition, or some biometric measurements.

Being such a horizontal product, the sectors for application are virtually any that requires any level of security in the authentication process, among others: digital platform accesses, with special attention to banking, purchases, online credit cards, etc. Likewise, as it is easily implemented in a purely physical product, the applicability sectors extend to physical security, such as access to security facilities or buildings (where today the authentication is usually performed by fixed PIN on metal keypads or similar mechanisms), use of credit cards, and any of all those processes requiring secure authentication.

The present invention provides the following advantages over prior art methods:

- The risk of secret exposure is near to zero, because the number of configurations, graphic features, and arrangements or variations of the graphic features results almost infinite.
- (Risk very reduced compared to other methods).
- The possibility of selection of these configurations, graphical features and variations between multiple possibilities (which may be even designed by the user), which in some way belong to part of the secret.
- The possibility of including distraction elements (features that do not matter for resolution, but further hinder artificial intelligence or brute force analysis).
- The ability of the user to choose all of the elements confers an important anti-phishing protection, since only the valid authenticator systems know (by having the instructions) how to create correct virtual keyboards that the user can recognize.

- The flexibility of these configurations allows even for even different forms of virtual keyboards, e.g, in the form of a clock, 12 keys, arranged in the perimeter of a circle, etc.
- The use of different and multiple cognitive mechanisms (capabilities of the human brain, not only adding), and among them, visual and spatial mechanisms (colour, offsets), which enable automation (meaning performing certain steps very quickly after a training, and without the need for verbalization), allows another key aspect of cybersecurity: to increase the difficulty of communicating the secret to others.
- The transformation possibilities are numerous: mathematical, logical, colour comparisons, position translation, complementary shapes. Thus, the transform rule may be somewhat as simple as a colour reference and a sum (much simpler for example than to compute squares of numbers), and even more secure (by having a very wide base of possible choices and transformations)
- The series of steps that the user has to reproduce are stored (in a particular part of the system), and so can validate that the user's resolutions and those calculated by the machine are the same. This prevents the storage of passwords, which allows for a lower risk of leakage.
- User input is sufficiently simple that it can be produced by direct selection of the key on a touch screen (not necessarily with an associated number), but also compatible with other methods (traditional keyboard, physical buttons, voice, etc.).
- The procurement of key selections of each virtual keyboard to form the final result (e.g two keys per virtual keyboard) allows dynamic security levels (such as if a PIN could have more or less digits in a supermarket than in a cashier).
- In turn, it makes it possible to incorporate graphical elements/features of a virtual keyboard in the following, which further increases the levels of security.
- The non-necessity of any external element (e.g calculators, as some other method proposes to mix the secret with a hash), thereby maintaining a total security against keyloggers and multiple recording attacks.
- The possibility of maintaining a single instance of critical parts (authentication unit, virtual keyboard generation unit) for a centralized user, as an identity provider, allows the rest of the system to not require high levels of security.
- It allows delegation of the authentication process to third parties (e.g, non-secure environments, another web page, in the middle of a video conference, public display), with no risk for security.

BRIEF DESCRIPTION OF THE DRAWINGS

A number of drawings that help to better understand the invention and which are expressly related to an embodiment of the said invention are presented as a non-limiting example, thereof are described in a very brief manner.

FIGS. 3A-3I illustrate different implementations of the mutual authentication system.

FIGS. 4A-4M show different examples of virtual keyboards used in the authentication process.

DETAILED DESCRIPTION OF THE INVENTION

Figure 1:
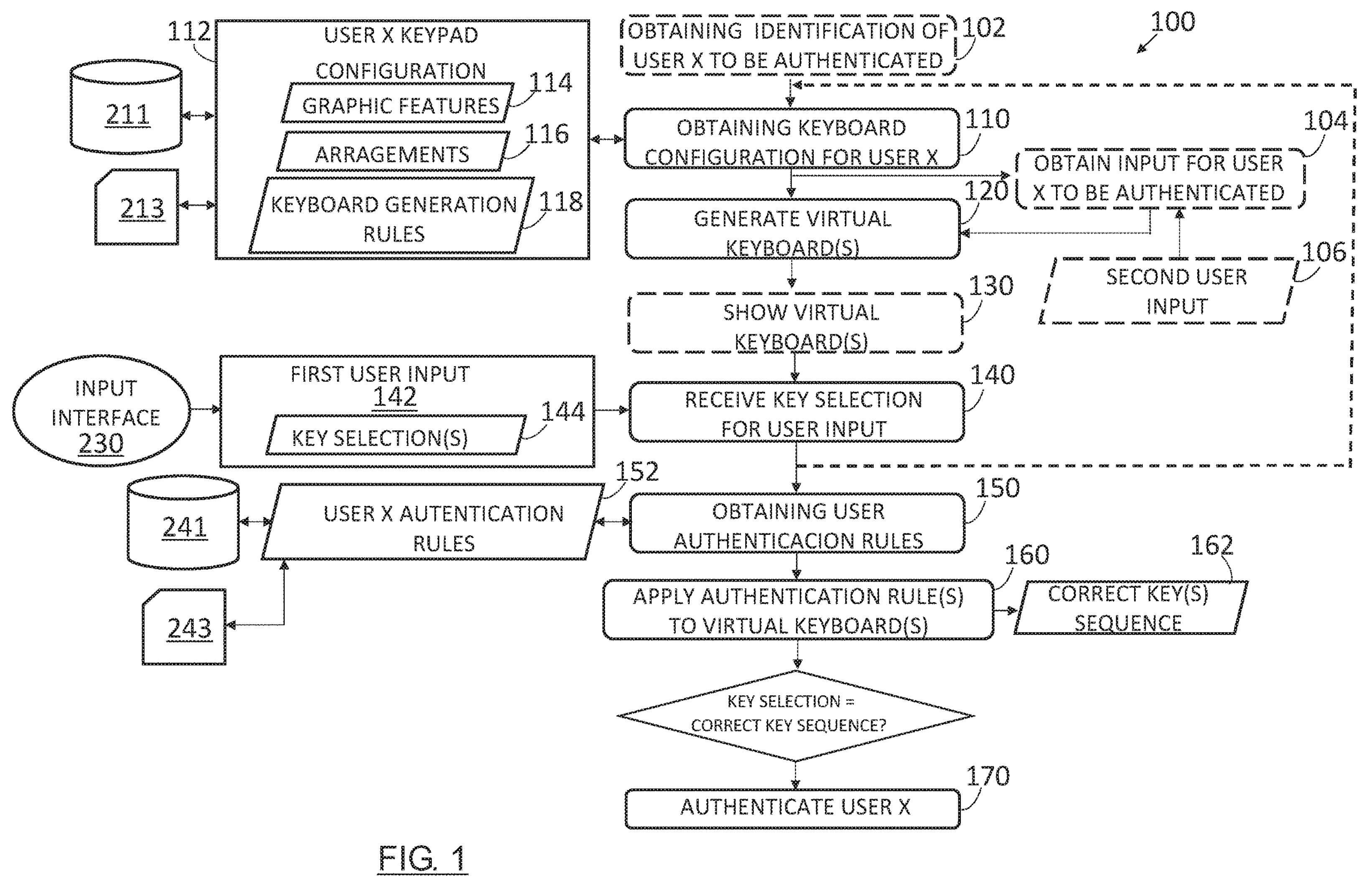
FIG. 1 depicts a flowchart of a mutual authentication method according to an embodiment of the present invention.

FIG. 1 shows a flow chart of a mutual authentication method 100 according to an embodiment of the present invention. The mutual authentication method 100 comprises the following steps:

- Obtaining 110 a keyboard configuration 112 of a user to be authenticated. The keyboard configuration 112 includes a plurality of graphic features 114, a plurality of arrangements 116 of the graphic features 114, and keypad generation rules 118.
- Generate 120 at least one virtual keyboard. Each virtual keyboard is formed by a plurality of keys incorporating a combination of graphic features 114 disposed in certain arrangements 116. The graphic features 114 and arrangements 116 used in each key are selected from the user's keypad configuration 112 based on the keyboard generation rules 118.
- Show 130 the at least one virtual keyboard to the user to be authenticated. Virtual keyboards are preferably represented in one or more screens, either fully or partially (e.g, if the virtual keyboards are shown in a single reduced size screen, e.g, the display of a smart watch, the user may be moved by the display to be able to view different portions of a virtual keyboard or different virtual keyboard). Alternatively, virtual keyboards may be displayed on paper, projected onto a surface by a projector, or in any other means of rendering information to a user.
- Receiving 140 a first user input 142 corresponding to a key selection 144 of each virtual keyboard performed by the user to be authenticated. Optionally, represented in dashed lines, this process may be iterative to thereby generate 120 and show 130 successively several virtual keyboard (e.g five virtual keyboard generated and shown in one) and receive 140 the first user input 142 corresponding to each iteration, where in each iteration it may optionally also obtain 110 the user's keypad configuration 112. By these iterations, virtual keyboards to be displayed may depend on previous inputs; for example, each virtual keyboard may have two key selections, where the first selection (first user input 142 with key selection) is used to calculate the solution and the second selection (second user input 106) is used to configure the next keyboard, so that if, for example, the second selection is chosen red, the next generated keyboard has to have red on the first key. The step of obtaining 104 the second user input 106 may alternatively be performed immediately before or after receiving the user input 140.
- This reinforces the mutual authentication, so that the user can choose (via the second user input 106) some feature that is combined or incorporated into the keyboard generation rules 118 so that the user can check the verification of the authentication system.
- Obtain 150 user authentication rules 152.
- Applying 160 the user authentication rules 152 on at least one virtual keyboard to obtain at least one correct key sequence 162.
- Authenticating 170 the user if the key selection 144 of the first user input 142 is validated with respect to a correct key sequence 162. For example, as shown in the embodiment of FIG. 1, the key selection 144 may be validated if it matches a correct key sequence 162.

The sequence in which some of the steps may be varied in regard to the order depicted in the flow chart of FIG. 1. So, for example, the step of obtaining of the user authentication rules 150 may be performed before, simultaneously, or after the step of obtaining user keyboard configuration 110.

For example, if the user keypad configuration 112 and user authentication rules 152 are stored on a same data storage device, both data can be retrieved simultaneously by accessing such data storage device. Also, step 160 of applying user authentication rules 152 on the at least one virtual keyboard may be performed before, simultaneously, or after step 130 of displaying the at least one on-screen virtual keyboard.

The mutual authentication method 100 may optionally comprise any of the following steps shown in dashed line:

An initial step of obtaining 102 an identification of the user to be authenticated, prior to the step of obtaining 110 the user's keypad configuration 112.

Obtaining 104 a second user input 106, such that at least one of the virtual keyboards 212 is generated based on the keyboard generation rules 118 and using said second user input 106. For example, the keyboard generation rules 118 may specify that the generated virtual keyboard has to include a user selected letter in the second key, and wherein the second user input 106 may include selection of said letter; thus, if the user selects for example the letter "B" as the second user input 106, the generated keyboard should include the letter "B" in the second key. If not, the user may know that the authentication system is not legitimate.

The second user input 106 may be provided in any part of the process, one or several times (e.g, iteratively), for use in generating any virtual keyboard. For example, it could be provided in conjunction with user identification (or at a previous or later time) to account in the step of generating virtual keyboards 120. O may be iteratively provided, at each iteration (dashed lines) in which different virtual keyboards are successively generated; in this case the second user input 106 may correspond to a key selection of one or more virtual keyboards (in the previous example, the user would select a key incorporating the letter "B") that will be used for the generation of the virtual keyboards of each successive iteration.

Display 130 or representing to the user to be authenticated the at least one virtual keyboard (e.g in one or more screens).

Figure 2:
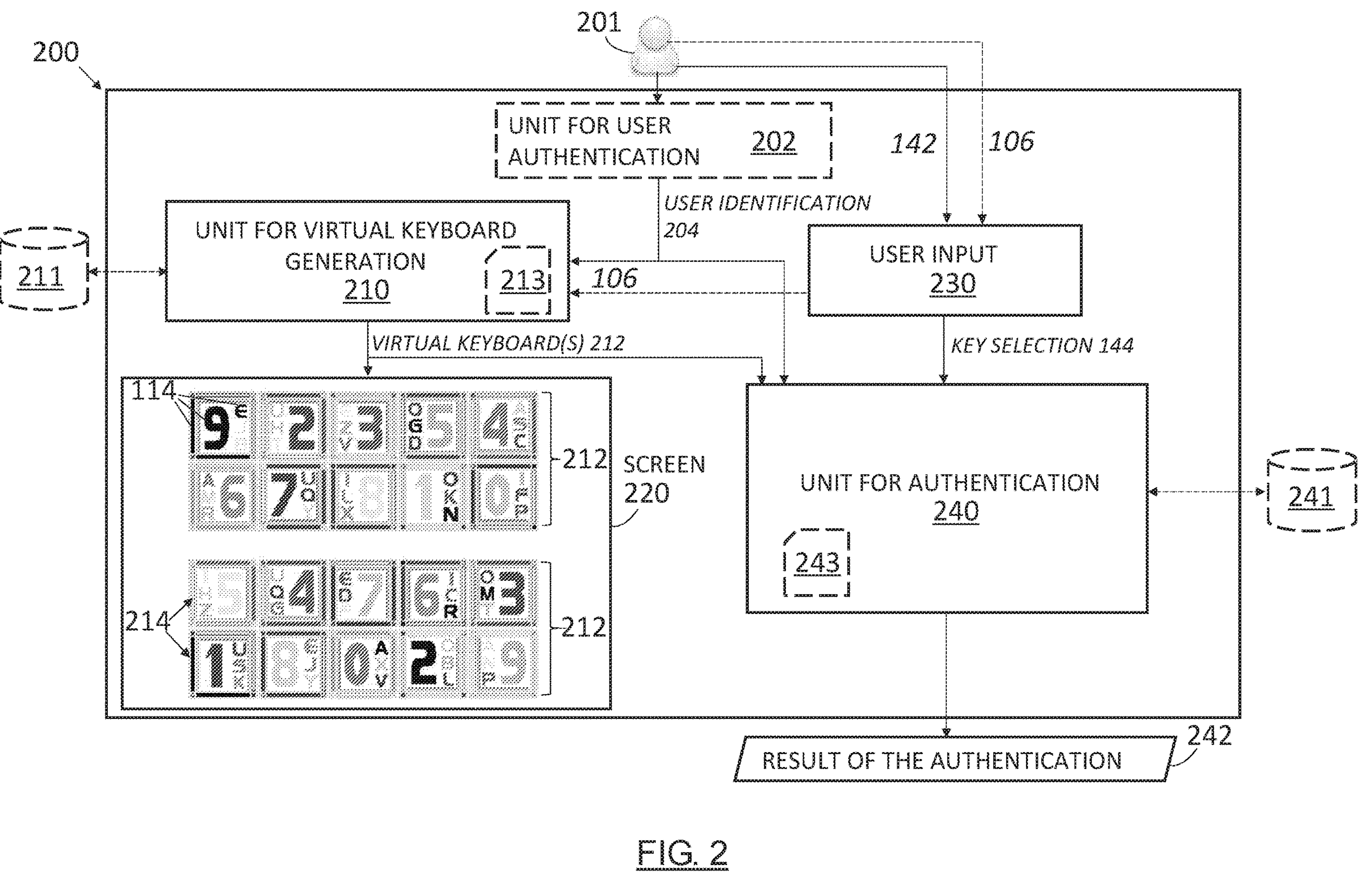
FIG. 2 depicts a mutual authentication system according to a particular embodiment of the present invention.

A mutual authentication system 200 according to an embodiment of the present invention is depicted in FIG. 2. The mutual authentication system 200 comprises a virtual keyboard generation unit 210, an input interface 230, and authentication unit 240. In one embodiment, the mutual authentication system 200 further comprises an information representation device, which may comprise, for example, at least one display 220.

The virtual keyboard generation unit 210 is configured to obtain the keyboard configuration 112 of a user 201 to be authenticated and generate at least one virtual keyboard 212, as described in steps 110 and 120 of FIG. 1.

The at least one display 220 is configured to show, as described in step 130 of FIG. 1, the at least one virtual keyboard 212, where each virtual keyboard 212 is formed by a plurality of keys 214.

In the example of FIG. 2 the mutual authentication system 200 employs a single display in which two virtual keyboards are depicted. However, the mutual authentication system 200 may include any number of displays 220, and in turn each display 220 may display any number (from 1 to n) of virtual keyboards 212.

The input interface 230 is configured to receive a first user input 142 corresponding to a key selection 144 of each virtual keyboard 212 performed by the user 201, as described in step 140 of FIG. 1

One embodiment the display 220 (or displays) may be a touch screen, and the input interface 230 would comprise such a touch screen, where the key selection 144 is performed by touching/pulsing on the touch screen 220, by the user 201, in keys 214 selected from each displayed virtual keyboard 212, in order to authenticate the system. In other embodiments, the input interface may comprise a physical keyboard for the introduction of key selection, a microphone with a voice recognition software to introduce user selection via voice, or generally any type of interface that allows receiving a selection of keys 144 by the user 201.

The selection of user keys 144 may be performed in multiple ways: by direct selection on the keys themselves or on affine elements (e.g keys of a physical keyboard representing some characteristic thereof, such as letter, digit or colour), by removal of keys, by key reordering, by fusion/combination of keys, or other processes through which the result is a sequence of keys or values of some characteristic determined in a specific order. Keys may also be selected using another type of interfaces, such as using gestures (e.g by pointing to the selected keys, which are identified by an image recognition camera), a sound interface (by voice recognition, through which the user verbally emits its key selection 144), among other interfaces.

Based on the configuration of the authentication rules 152, the user may need to select one, two or more keys 214 of each virtual keyboard 212 shown on display 220.

For example, the user 201 may press the keys '2' and '8' (i.e., the keys in which numbers 2 and 8 appear) of the upper virtual keyboard 212 and the '5' and '0' keys of the upper virtual keyboard 212 (i.e., two keys 214 of each virtual keyboard 212 must be selected). Based on the authentication rules 152 followed, the selection order of the keys 214 may be taken into account for authentication. In this case it would not be the same to select on the upper virtual keyboard 212 first the '2' key and then the '8' key which, in turn, first the '8' key and then the '2' key.

The authentication unit 240 is configured to execute the steps related to user authentication, once the key selection 144 of the user 201 (steps 150, 160, and 170 of FIG. 1) is received. In particular, the authentication unit 240 obtains authentication rules 152 from the user 201 and applies such authentication rules 152 of the user 201 over the at least one virtual keyboard 212 generated by the virtual keyboard generation unit 210, thereby obtaining at least one correct key sequence 162. Finally, authenticates the user 201 if the key selection 144 of the first user input 142 is validated in regard to a correct key sequence 162 (e.g, if the first user input 142 exactly matches a correct key sequence 162). In the event that key selection 144 is not correctly validated (e.g, if key selection 144 does not match any correct key sequence 162), user 201 is not authenticated (similar to not introducing the correct PIN that was expected from the user). Definitely, the authentication unit 240 is responsible for outputting a result of the authentication 242, which may be positive (correct authentication) or negative (failed authentication).

The mutual authentication system 200 may comprise a user identification unit 202 configured to obtain 102 an identification 204 of the user 201 to authenticate. For example, the identification 204 may include introducing, by the user 201 via a keyboard, a username and/or password with which the mutual authentication system 200 may identify the user 201. The identification 204 of the user 201 is received by the user identification unit 202, which transmits it to the virtual keyboard generation unit 210 and to the authentication unit 240.

The virtual keyboard generation unit 210 may be configured to obtain the keyboard configuration 112 of the user 201, once conveniently identified, by accessing an external database 211 (e.g on a remote server) or an internal memory 213 (a memory or data storage medium that forms part of the mutual authentication system 200), in order to obtain the identified user keyboard configuration 112.

The database 211 or memory 213 may include multiple keypad configurations 112, corresponding to different users. In this way, the user identification allows access to the proper registration of the database or memory 213, corresponding to the user who has been identified.

The authentication unit 240 may be configured to obtain the authentication rules 152 of the user 201, once identified, by accessing an external database 241 (e.g on a remote server) or a memory 243 internal to the system (e.g a flash memory, a hard drive, or any other data storage medium).

The data storage medium employed to store the keyboard configuration 112 (e.g, database 211 or memory 213) may be the same storage medium in which the authentication rules 152 are stored.

For example, the keyboard configuration 112 and the multi-user authentication rules 152 may be stored in a single memory or database, either external to the system (e.g located on a remote server) or internal thereto.

The elements that make up the system may form part of a same electronic device or may be distributed in different electronic devices. In the first case, the mutual authentication system 200 may be implemented in any electronic device that includes an input interface 230, a control unit or processor capable of processing data (e.g, a portable, a computer, an electronic tablet, a smart phone, a processor integrated in any electronic circuit, etc.) and, optionally, a display 220 (or any other physical or virtual support where a user is depicted to authenticate the succession of keyboards).

In this way, different components of the system (such as user identification unit 202, virtual keyboard generation unit 210, and authentication unit 240) may be logic units that are incorporated within a processor or controller of the electronic device.

For example, as shown in FIG. 3A, the mutual authentication system 200 may be implemented in a computer 310, which includes a monitor 312 (with display function 220), a keyboard 314 and/or mouse (with input interface function 230), a processor (with user identification unit 202, virtual keyboard generation unit 210, and authentication unit 240), and a hard disk where the keyboard configuration 112 and the authentication rules 152 of the user 201 (and, optionally, other users) are stored. Alternatively, the keyboard configuration 112 and the authentication rules 152 may be stored in a remote storage medium, such as a database of an external server, to which the computer accesses via a communication unit, whether wired or wireless.

In FIG. 3B an example is shown in which the mutual authentication system 200 is implemented on a smartphone 320. In this case the touch screen 322 of the smartphone 304 has the display function 220 and input interface 230. In this case the result of the authentication 242 that obtains the mutual authentication system 200 may be employed, for example, to unlock the phone or generally for any operation performed on the smartphone in which an authentication of the user 201 is required.

The mutual authentication system 200 may be implemented in many other electronic devices, such as in a smart watch 323 for authenticating user operations (FIG. 3C); in an automatic teller machine 324 for taking cash (FIG. 3D); at a point-of-sale terminal for card payments (FIG. 3E); or in an access control system 326 for accessing public/private spaces (FIG. 3F) or for opening cabinets or lockers (e.g in a gym).

The electronic devices (310, 320, 323, 324, 325) shown in FIGS. 3A-3E comprise a display 220 for displaying the virtual keyboard 212 (or virtual keyboards).

Figure 3F:
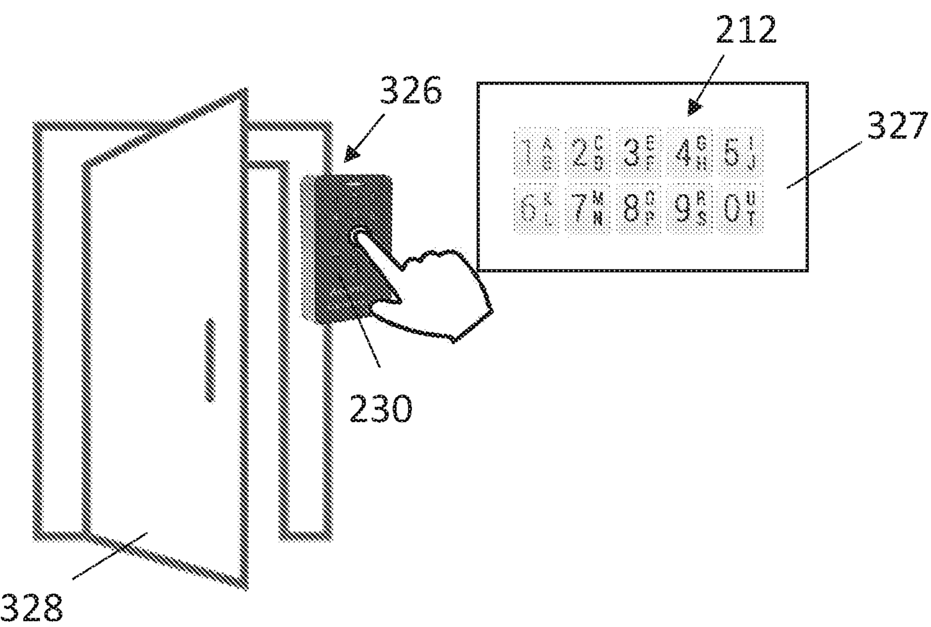

However, the electronic device depicted in FIG. 3F, access control system 326, does not have a display 220. In this case the virtual keyboard 212 (or virtual keyboards, if several) are shown printed, for example in a paperboard or paper sheet 327. The virtual keyboard generation unit 210 of the mutual authentication system 200 generates the virtual keyboard 212, which is printed on a sheet 327 using a printer and it is disposed adjacent to the access control system 326 or the door 328 controlled thereby, for example glued to the wall. That virtual keyboard 212 will mark one or more correct key sequences 162 that must enter the user, using the input interface 230 (e.g, a keyboard), in order to open the door 328. This virtual keyboard 327 could be replaced periodically, for example every day or every certain hours could be printed with a new virtual keyboard instance 327 for broadcasting third party observation attacks. In this embodiment the mutual authentication system 200 could be easily implemented in already existing access control systems 326, which do not have a display 220.

The authentication unit 240 may be configured to obtain a plurality of correct key sequences 162 by applying the authentication rules 152 of the user 201 over the at least one virtual keyboard 212.

In the event that there are a plurality of correct key sequences 162, each correct key sequence 162 may be associated with a different identity, i.e., to a different user. In this way the authentication unit 240 may be configured to identify the user between a set of users, based on the correct key sequence 162 that the user has entered as its key selection 144.

In the example of FIG. 3F each user may have associated different authentication rules 152, such that applying the authentication rules 152 of the different users on the same virtual keyboard would be reached to different correct key sequences 162. In this way the concrete entered correct key sequence 162 has the user not only authenticated to open the door, but also to de identified among a group of users. Thus, assuming for example that the correct key sequence 162 for the user 1 is the keys {5, 2, 8}, and for the user 2 the keys {7, 3, 1}, when an unauthorized user is to authenticate to the access control system 326 will not know which keys should be selected because the authentication rules 152 will be unknown to apply, whereby the system will not allow access.

If an authorized user enters the keys {7, 3, 1}, the mutual authentication system 200 will open the door 328 because the key selection 144 is validated with respect to one of the correct key sequences 162, namely with respect to the correct key sequence 162 corresponding to the user 2. In addition, the system will be able to identify which user to access, in this case the user 2. This dual authentication and identification functionality may be very useful for example to control the access of workers to a work area (e.g, a laboratory), where the authentication would ensure that the user is an authorized worker for access to the substance, and the identification would allow identifying the particular user to which it has been accessed.

Having a plurality of correct key sequences 162 may also be employed for the authentication unit 240 to authenticate the user 201 based on different authentication levels, based on the correct key sequence 162 with respect to which the key selection 144 is validated. For example, a first authentication level may be a correct authentication and a second authentication level may be an alarm authentication. Authentication with different levels may be useful in situations requiring additional aspects to be known to the authentication itself, such as if there is a dangerous or alarm situation. Thus, a cashier may enable access to the box by a first authentication level (a first correct key sequence 162), or enable access to the box by a second authentication level (a second correct key sequence 162), where the first authentication level involves correct authentication and the second authentication level involves an alarm authentication, which could be employed when the user is threatened.

Figure 3G:
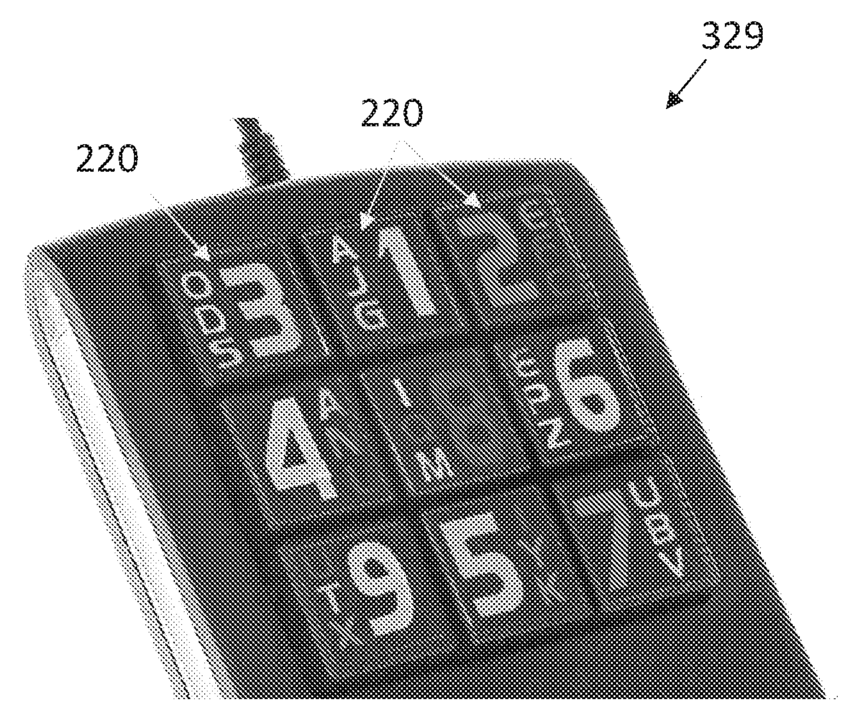

In the example depicted in FIG. 3G, the mutual authentication system 200 is implemented in an electronic device 329 comprising a plurality of displays 220 in a virtual keyboard 212. Specifically, on each screen 220 is depicted a key 214 of the virtual keyboard 212. Keys 214, ordered in a 3-row and 3 column array, make up the virtual keyboard 212. The displays 220 of the electronic device 329 are tactile, thus making the input interface functions 230. The user performs key selection 144 by interacting (e.g by pulsing) with the display 220 on which the keys 214 are depicted, thereby minimizing hardware components required for authentication.

Figure 3H:
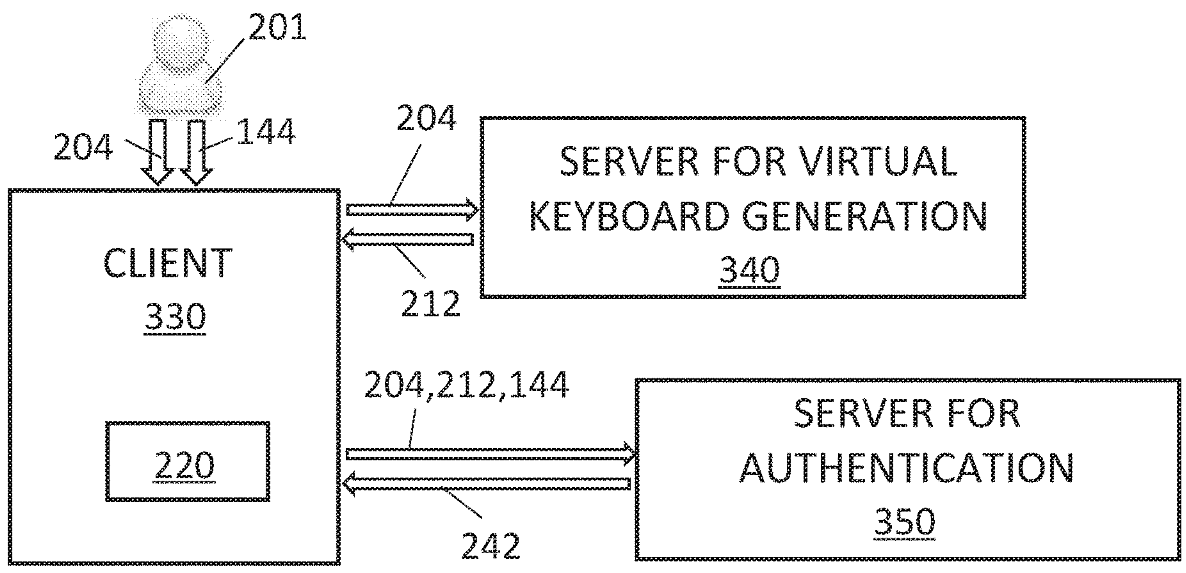

In the examples shown in FIGS. 3A-3G the elements of the mutual authentication system 200 may form part of a single electronic device. However, the elements of the mutual authentication system 200 may be distributed in different entities or electronic devices. For example, as depicted in FIG. 3H, the mutual authentication system may include a client device 330 and external entities to the client device 330 (e.g, one or more servers), connected for example via the Internet. The client device 330 is the electronic device or entity that wants to authenticate a user 202, such as a computer or smart phone (authentication may be required by an application operating on the electronic device). According to the example of FIG. 3H, the client device 330 receives the user identification 204 and requests a virtual keyboard generation server 340 (having the functions of the virtual keyboard generation unit 210) to generate at least one virtual keyboard 212. When received, the client device 330 is displayed on a display 220 (e.g on the display of the device where the web application is operating). Once the client device 330 has received from the user 201 the key selection 144, the client device 330 requests authentication of the user 201 to an authentication server 350, thereby sending the at least one generated virtual keyboard 212, the user identification 204, and the key selection 144. The authentication server 350 (having the functions of the authentication unit 240) sends to the client device 330 the result of the authentication 242. The client device 330 will act based on the result of the authentication 242, e.g blocking access to the user in the case of failed authentication.

In this way, the client device 330 has performed an authentication of the user without locally storing information from the user 201 that can be compromised. Such information (e.g the keyboard generation rules or the authentication rules 152 determined for the user 201) are securely stored in the remote servers 340 and 350. Thus, authentication has been performed securely, without possible theft of the user's compromised information 201 even though the client device 330 is subject to an attack. In other possible embodiments, the system may be implemented in a greater or lesser number of entities or devices. For example, the display 220 may be located external to the client device 330, in another device. In another example, the client device 330 may communicate with a single server, which has the virtual keyboard generation and authentication functions (i.e., the virtual keyboard generation server 340 and the authentication server 350 may be the same entity).

Figure 3I:
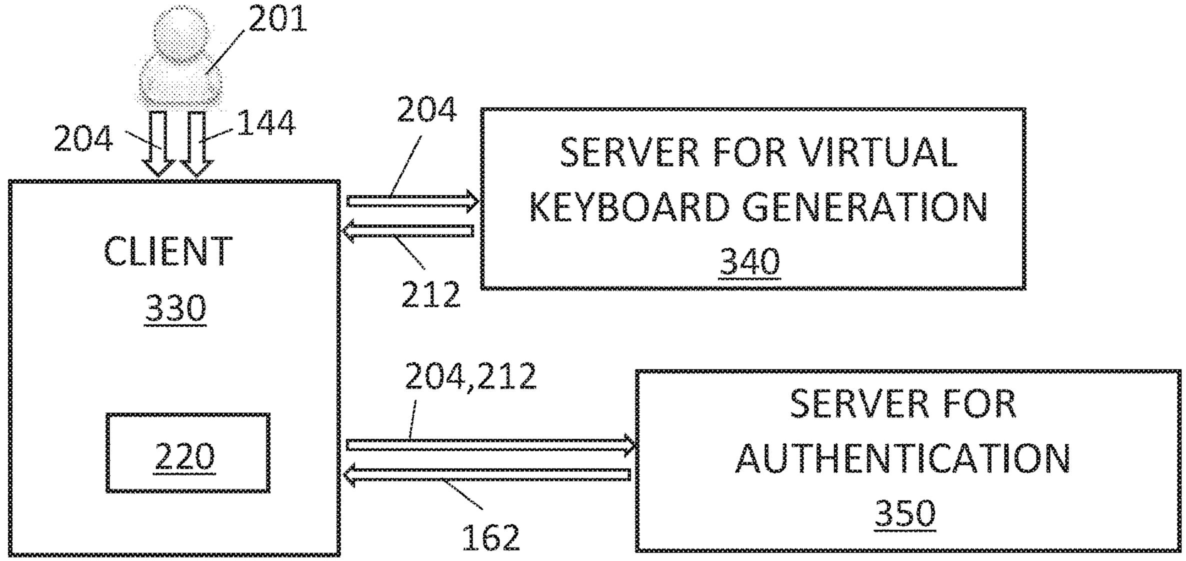

The different functions of the authentication unit 240 may be distributed in various devices, for example a first device that is responsible for applying the authentication rules to obtain the correct key sequence and a second device that is responsible for validating the key selection with respect to the correct key sequence to authenticate the user. Thus, in the example of FIG. 3I (very similar to that of FIG. 3H), the client device 330 may send to the authentication server the user identification 204 to authenticate and the virtual keyboard 212, but without sending the user key selection 144. The client device 330 receives the correct key sequence 162 generated by the authentication server 350, and validates the key selection 144 with respect to the correct key sequence 162 to authenticate the user 201.

Several examples illustrating various generated virtual keyboards, employing different graphical features 114, arrangements 116, and keyboard generation rules 118 are shown. The authentication process is based on one or more images (virtual keyboard 212) represented in one or more displays 220, where each image illustrates a number of pieces (keys 214) similar but different to their visual characteristics, where each of them shows different graphical features with which the user 201 may set rules to arrive at a result, which is entered by the user 201 using the same display (in the event that it is tactile), a keyboard or other data entry system arranged therefore.

Figure 4A:
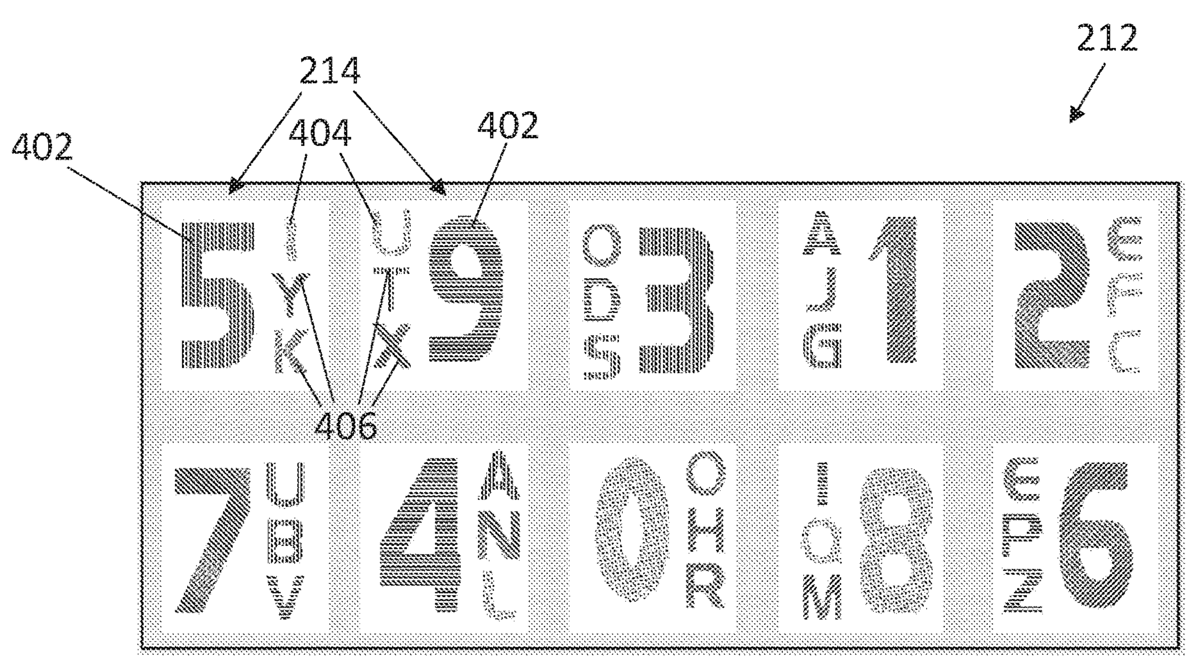

In FIG. 4A, for example, a virtual keyboard 212 formed by a set of ten keys 214, while a virtual keyboard 212 may be comprised of a number N (N≥2) any of keys 214. In this example the keys 214 are grouped into a rectangular array of two rows and five columns. The keys 214 may, however, be grouped in multiple shapes (e.g, a circular distribution, a rectangular distribution, a free distribution), as determined in the keyboard generation rules 118 of the keypad configuration 112 of the corresponding user 201. In this example the keys 214 could be arranged for example in circle, in a matrix of 5 rows and 2 columns, or any other suitable arrangement.

Each key 214 is configured according to a combination of graphic features 114 and arrangements 116 thereof. In the example of FIG. 4A, the following graphic features 114 and arrangements 116 are considered:

Graphical features:

- Numbers 402 (0 through 9).
- Vowels 404 (a, e, i, o, u).
- Consonants 406 (b, c, d, f, g, h, j, k, l, m, n, p, q, r, s, t, v, w, x, z).
- Colours (five colours: red, blue, green, yellow, black). The blue colour of the graphic feature is represented with right-hand inclined beam (e.g, numbers 2 and 7), the yellow colour is illustrated with a right turn-up beam (e.g, numbers 1 and 6), the red colour by vertical scratching, the black colour by horizontal scratching, and the green colour by a dotted fill.

Each key 214 may have two different arrangements 116 of the graphic features 114:

At the left, the entire height of the key and two thirds of the width, leaving the right third arranged in three gaps of height one third each, and located vertically where three letters of determined shape (1 vowel up and 2 consonant below) are placed.

On the right, the same ratios, and the three gaps to the left.

Some graphical features may include sub-features (such as size and colour) of the graphic features. In this way, a graphical feature 114 may be formed by a main feature, which defines the shape of the graphic feature 114, and a secondary feature or sub-feature, which defines a feature of the main feature, such as the size or colour of the main feature. Thus, in the example of FIG. 4A, the main feature "9" has as a secondary feature the black colour. In the event that the main feature "9" could be represented in the key 214 with various different sizes, each of said possible sizes would be a secondary feature of the main feature.

The arrangements 116 may be considered individually at the graphical feature level 114. Thus, instead of considering two different key arrangements in the example of FIG. 4A, each graphic feature 114 may be considered to have several different arrangements:

The numbers 402 have two possible arrangements in the key 214, to the right or left place of the key 214.

The vowels 404 have two possible arrangements in the key 214, above-right or above-left on the key 214.

The consonants 406 have four possible arrangements in the key 214, right-middle, left-middle, right-down, and left-down on the key 214.

Other possible virtual keyboards 212 are shown in FIGS. 4B-4M.

Figure 4B:
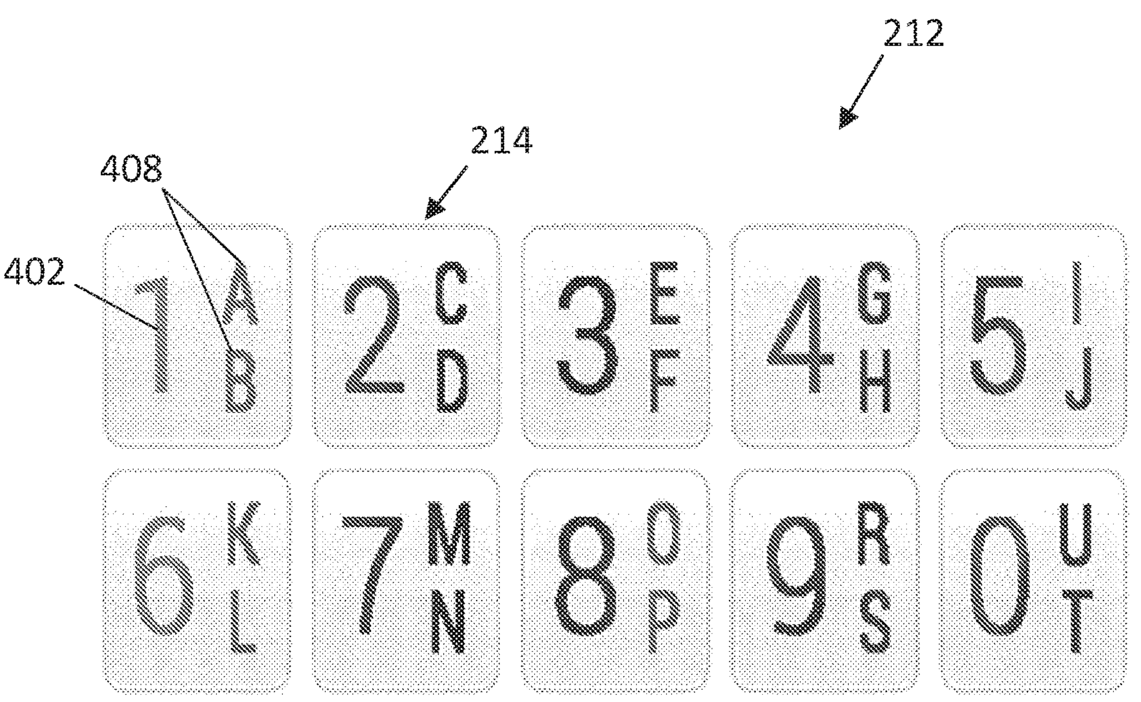

The virtual keyboard 212 of FIG. 4B is composed of 10 keys 214, grouped into two rows and five columns. Each key 214 is formed by a number 402 and two letters 408 (vowels or consonants).

The number 402 occupies the entire height of the key and half of the width, leaving the right side disposed in two vertically situated height half holes where two letters 408 are placed.

Figure 4C:
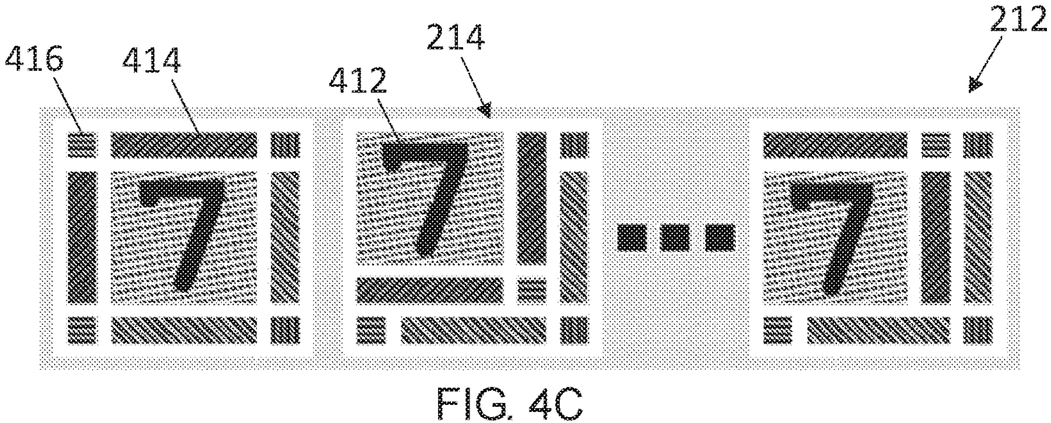

In FIG. 4C, a virtual keyboard 212 formed by a plurality of keys 214. Each key 214 includes a number of graphical features 114: a numeric element 412 included in a rectangle of a certain colour (e.g, a green background, represented by a dashed ray), four edges 414 (represented by rectangles) and four vertices 416 (represented by small squares). The numeric element 412 is disposed in a certain arrangement 116 within the key 214 (e.g centred arrangement, left upper corner arrangement, left side arrangement), among multiple possible arrangements. The edges 414 and vertices 416 may also have multiple arrangements, as seen in FIG. 4C, where the arrangement may include rotation of the graphic feature 114 (e.g, two edges 414 appear in horizontal arrangement and two edges 414 appear depicted in vertical arrangement, rotated 90°). In addition, edges 414 and vertices 416 may take different colours as secondary features. In this example, and taking into account that the figures are shown in white and black, the red colour is represented with an up-right inclined ray, the yellow colour with a right-down inclined ray, the colour cyan with a horizontal ray, and the blue colour with a vertical scratch.

Figure 4D:
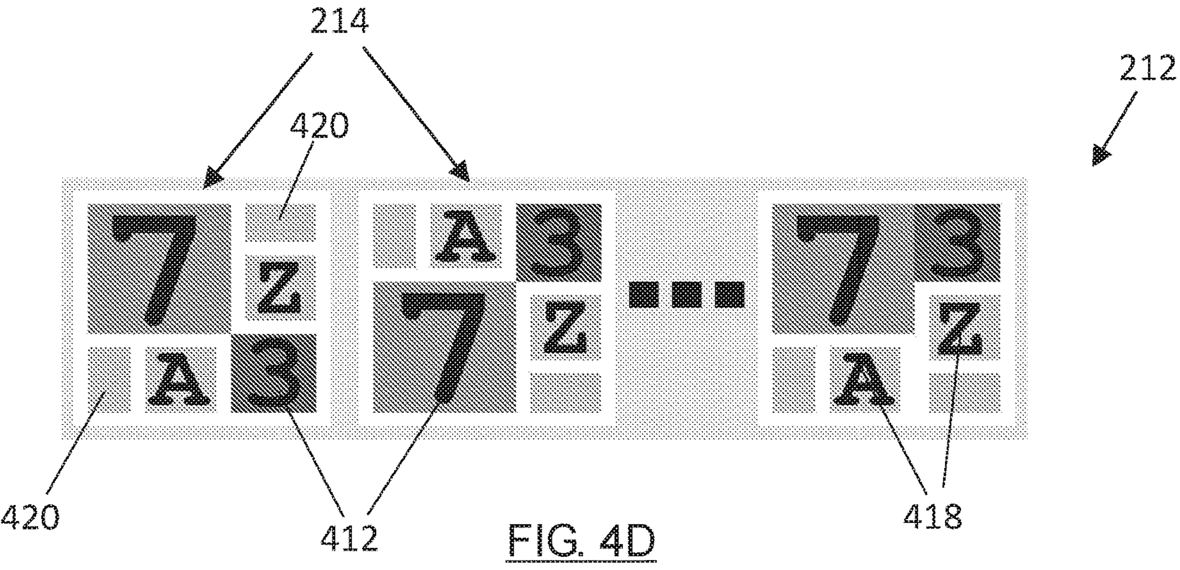

In the virtual keyboard 212 of FIG. 4D, the keys 214 include two numerical elements 412 (a "7" and a "3", each having a different size and with a different colour), two textual elements 418 (the letters "A" and "Z", with a background of a given colour), and two rectangles 420. The numerical elements 412 disposed on either of the corners, thus assuming twelve different configurations (only considering the numerical elements 412). In turn, the rectangles 420 and textual elements 418 may have multiple arrangements within the key, which increases the number of possible combinations of graphic features 114 to generate a key 214. In the arrangements the rectangles 420 are also considered the rotation (a rectangle appears horizontally disposed and the other rectangle appears vertical).

Figure 4E:
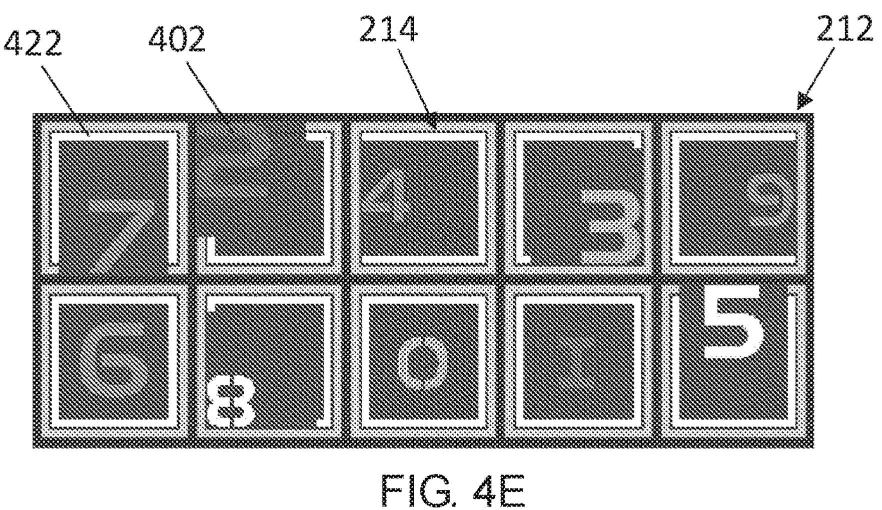

In the example of FIG. 4E the virtual keyboard 212 is composed of ten keys 214 arranged in two rows and five columns. Each key 214 incorporates a white rectangular edge 422 and a numeric element 402 included in a black background rectangle (main graphic feature), which may acquire different secondary features: one of five possible colours in even-odd pairs, and one of two available sizes (also according to colour). The numbers 402 may take different arrangements in regard to the edge 422 (e.g, centred, on a corner, on a side). In this manner there are a multitude of graphic feature combinations 114 (including primary and secondary features) and arrangements 116 to generate a virtual keyboard 212.

Figure 4F:
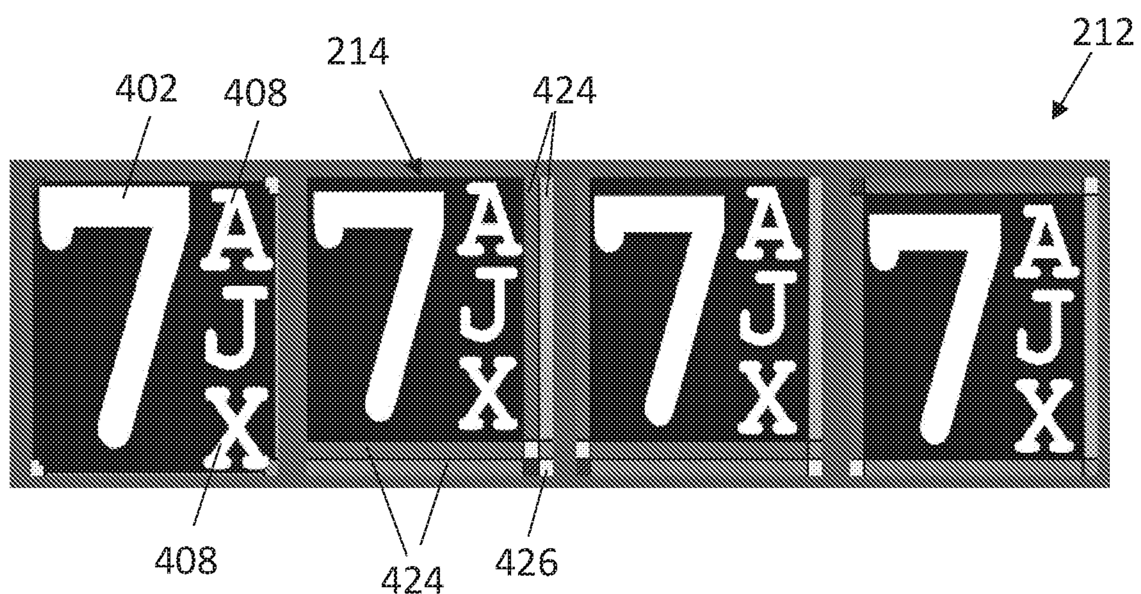

The virtual keyboard 212 of FIG. 4F is composed of four keys 214 arranged in row. Each key 214 includes a core element composed of a number 402 (in the example, the number "7" is shown) and three letters 408 ("A", "J", y "X", in the example), arranged similarly to the first key 214 of the virtual keyboard 212 of the example of FIG. 4A. The central element may be located in ten different ways relative to a set of edges 424 (rectangles arranged horizontally or vertically on the sides of the key 214) and vertices 426 (small squares in the corners). In the example, the central element is shown covering the edges (first key); at the top-left corner, leaving the edges below and to the right (second key); above centred, leaving the side edges at opposite locations and both horizontal edges on the bottom side (third key); and centrally located (fourth key). Thus, there are ten identifiable variations for this type of arrangement of the centre element relative to edges 424 and vertices 426.

Figure 4G:
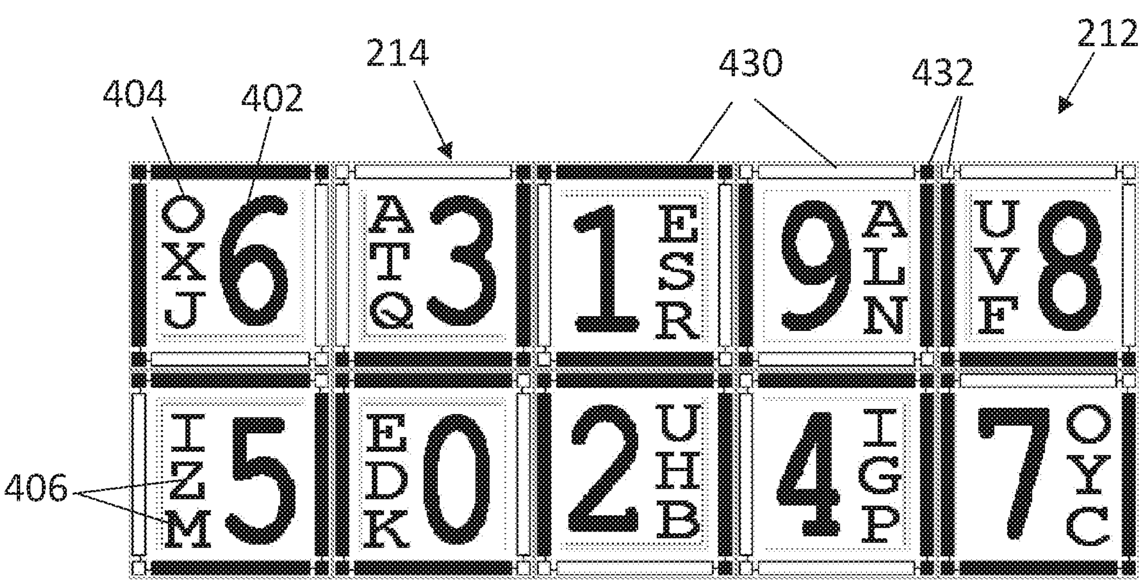

A monochrome example of a virtual keyboard 212 is shown in FIG. 4G where the graphic features 114 of each key 214 include a number 402, a vowel 404 and two consonants 406, similar to the example of FIG. 4A but in this case in black, without including as much colour as a secondary feature. The graphic features 114 also include four rectangular side edges 430 (disposed on each side of the key 214) and four square vertices 432 (disposed at each corner of the key 214), which themselves include the colour as a second feature, as each of the side edges 430 and the vertices 432 may be white or black colour fillers, which increases the possible number of combinations of graphic features and arrangements. The numbers 402 and letters (404, 406) may be arranged left or right. Each key 214 of the virtual keyboard 212 employs a different number 402. In the virtual keyboard 212 five different pairs of vowels 404 are employed in pairs according to the right/left arrangement, and twenty consonants 406. Thus, the number of possible combinations of graphic features 114 and arrangements 116 to form the virtual keyboard 212 is enormous.

Figure 4H:
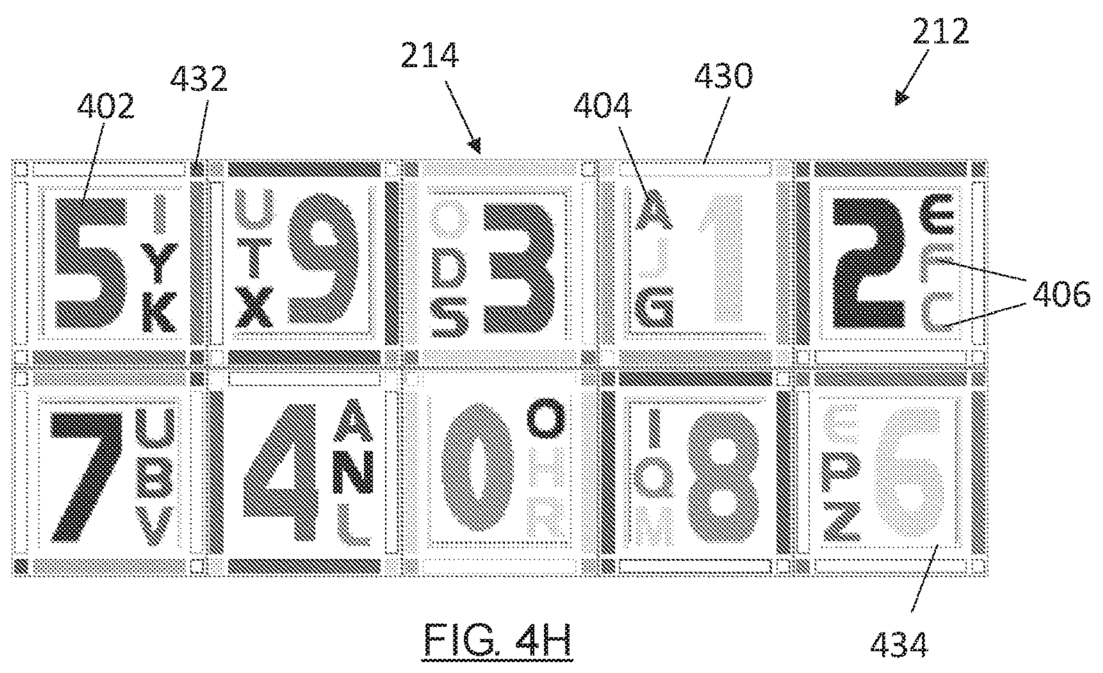

Another example of virtual keyboard 212 based on the keyboard of FIG. 4G is shown in FIG. 4H, but including five colours as secondary features for each graphic feature (number 402, vowel 404, consonant 406, side edge 430 and vertex 432). The graphic features 114 are independently coloured:

the side edges 430 and the vertices 432 or corners according to the row (top/bottom) and the number 402 and the vowels 404 according to the right/left arrangement. The numbers and letters, as well as their respective colours, match those shown in FIG. 4A. In this example, the consonants are randomly coloured without being considered a characteristic feature, data that is unknown to a possible attacker and that it would add more complexity for an analysis attempt. A further arrangement is included in this virtual keyboard 212: the location of the main element formed by the number 402 and the three letters (404, 406) in regard to fine edges 434 that separate the major side edges 430 of colours, with ten possible variations in the arrangement, which further increases the total number of graphic features 114 and available arrangements 116.

Figure 4I:
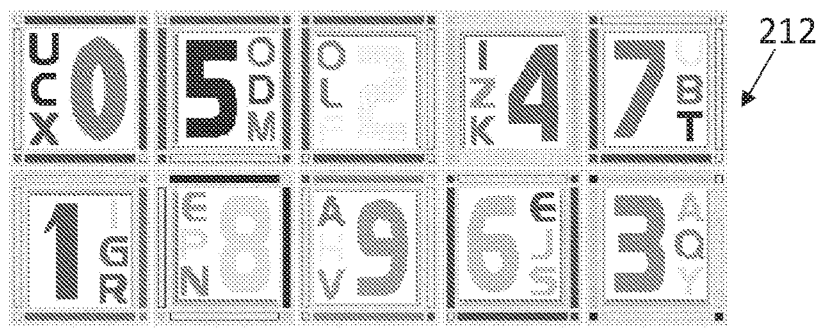
Figure 4J:
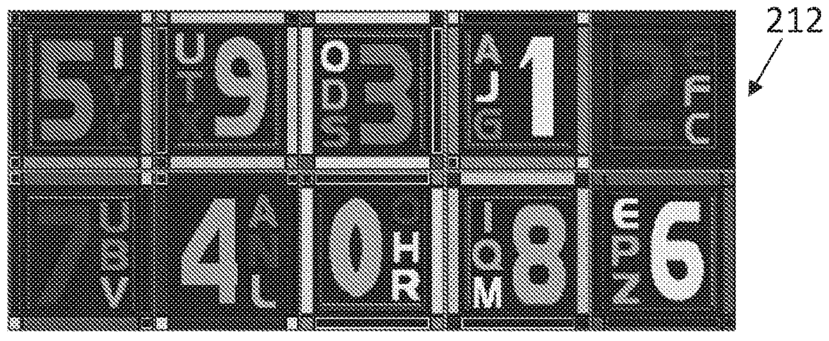

FIG. 4I depicts the above example of FIG. 4H but enlarged the number of colours to ten, increasing the total number of graphic features 114 and available arrangements 116. As there are ten keys and ten colours, the colours of a same graphic feature 114 are not repeated on the virtual keyboard 212 (with the exception of the consonants 406, where the colour is randomly chosen). FIG. 4J shows the same example of FIG. 4H but with black colour background, where the numbers and letters, and their respective colours, match those shown in FIG. 4A. Using a white background (FIG. 4H) or a black colour background (FIG. 4J) may be another graphical feature (secondary feature) to be considered in the generation of the virtual keyboard 212, which could be performed based on an external element (such as considering the even or odd day of the current date), which would allow additional security against spoofing and phishing. For example, if the user 201 is shown a virtual keyboard 212 with black colour background and the user 201 knows, based on the knowledge of the keyboard generation rules 118, that being an even day of the month, the virtual keyboard 212 should have the white background, the user is able to detect that the virtual keyboard 212 is incorrect and there has been some attack against the security in the authentication process.

In the examples of FIGS. 4A-4J a relatively simple configuration for the virtual keyboard 212 is used; however, the configurations of the virtual keyboards 212 may be more complex (e.g, 24 keys 214 arranged in four rows and six columns). Other possible virtual keyboards 212 with different graphic configurations and features are illustrated in FIGS. 4K-4M.

As can be seen in the different embodiments of virtual keyboards 212, a wide variety of graphical features 114 may be employed. The graphic features may comprise, for example, any of the following elements: a number 402, a vowel 404, a consonant 406, side edges 430, vertices 432, thin edges 434, different symbols (e.g, circle, star, triangle, deck petals, etc.), colours, font sources, graphics created by the user, and padding patterns, among others.

Thus, and returning to FIG. 2, the mutual authentication system 200 generates a virtual keyboard 212 (or virtual keyboards) based on a previous configuration, according to keyboard generation rules 118. The mutual authentication system 200 on one side computes a result that is deemed correct (correct key sequence 162) according to authentication rules 152, and on the other hand shows the display 220 to the user 201 the virtual keyboard 212 (or virtual keyboard) generated for the user 201 to compute its own result and select the timely keys 214 (key selection 144). Finally, the mutual authentication system 200 checks whether the user key selection 144 is validated with respect to a correct key sequence 162 to authenticate the user (e.g in the event that they match) or not authenticate (e.g if they do not match).

The virtual keyboards 212 are generated by a combination of graphic features 114 and arrangements, thereof in each key 214, according to the previously fixed keyboard generation rules 118.

The keyboard configuration 112 of a user 201 is previously determined, in a keyboard configuration step in which the user 201 may intervene or may be performed automatically by a computer system. The configuration process, specific to a user 201, is carried out through the selection of the graphic features 114 and arrangements 116, such that each key 214 results in the variation of a given number of graphic features 114 and graphic features 116, so that the statistical probabilities are kept constant, thereby avoiding attacks by probability analysis.

In the configuration process, the graphics features 114 are selected from a set of available graphics features (which may include main features relative to the shape and secondary features, such as size and colour). In such a selection, the user may intervene. Alternatively, the selection may be performed automatically, e.g randomly. For each graphical feature, several secondary features may be selected, such as two possible sizes or five possible colours. Some graphical features may be defined solely by a main feature, without having secondary features. The graphic features 114 may include, among other multiple options: other graphical elements such as symbols instead of letters or numbers, different font sources or sizes, simple geometric shapes such as squares and rectangles, delimiting specific zones of each key, colour patterns within these geometric shapes, greater or fewer numbers affecting not only the aforementioned elements, but also to the edges, or the backgrounds of said elements.

In the configuration process, the possible arrangements 116 of each graphic feature are also selected from a set of available arrangements; for example, for some graphical features, arrangements are not selected, and for other graphical features, if different arrangements are selected relative to the position and/or orientation of the graphic feature 114 within the key 214 (e.g the graphical feature may be disposed to the right or to the left of the key, the graphical feature may be rotated 0° or 90°, etc.).

The different arrangements may be combined with each other (e.g the various positions are combined with the various possible orientations), which increases the possible combinations of graphic features and arrangements for generating each key 214. In the selection of the arrangements 116 may intervene the user; alternatively, the selection may be performed automatically (e.g randomly).

The arrangements may have more complex and numerous parameters (e.g, the numerical character arrangement may be located in ten different ways relative to an edge of a given width: centred, up/down/right/left, at the four corners, or covering much of it).

In the configuration process, the keyboard generation rules 118 are also determined, which take into account the graphic features 114 and selected arrangements 116, and incorporate general rules that determine how each keyboard is generated using the graphic features 114 and selected arrangements 116. The keyboard generation rules 118 include instructions for determining the number of keys 214 to be generated for each keyboard, how the keys of the virtual keyboard 212 are disposed (e.g, circular; in a 5 row and 2 column matrix, etc.), and how the content (graphic features 114 and arrangements 116) of each key 214 are determined. For example, the keyboard generation rules 118 employed in generating the virtual keyboard 212 of FIG. 4A may include the following rules:

- Ten keys 214 are randomly arranged by choosing five left arrangements and five right arrangements.
- In each of the keys 214 is randomly located an unrepeated number 402 of the decimal set (thus, a different number 402 in each key 214).
- The top row numbers 402 are randomly coloured by each of the five available, unrepeated colours. Likewise, the lower row.
- Five pairs of vowels 404 (two "A", two "B", etc.) are randomly coloured and are arranged in the upper small gap, taking into account the left/right arrangement, so each vowel 402 covers both options (e.g, the two vowels "A" are located, one on the right of the key, and the other in the left of the key).
- The twenty consonants 406 are uniformly coloured in the five available colours (ie, four of each colour), and are arranged randomly in the small middle and small lower holes.

Thus, the number of possible combinations of virtual keyboards 212 for this specific configuration would be the result of the combination of all possibilities for the arrangements, of the numbers, of the colours, of the numbers, etc.

The configuration of each virtual keyboard is specific to a particular user, there may be very similar and indistinguishable configurations to the third-party's eye (e.g, the vowels are arranged in the gaps taking into account the upper/lower column, rather than the right/left arrangement).

The keyboard generation rules 118 may also include instructions for determining the number of virtual keyboards 212 to be generated, where each virtual keyboard 212 may be generated using the same or different rules of generation (e.g, generate two virtual keyboards 212 using first generation rules for the first virtual keyboard and second generation rules for the second virtual keyboard). The number of keyboards to be generated may be employed to configure the level of difficulty of authentication (for a specific user may be simpler an authentication using a single virtual keyboard than an authentication employing two virtual keyboards).

In the configuration process, the authentication rules 152 of the user 201 are also defined. These rules determine the criteria to be used for, from one or more virtual keyboards 212, the selection of certain keys 214. The authentication rules 152 also determine how many keys must be selected, and may also determine how the first user input 142 is performed with the key selection 144. For example, and comparing with a input of a four digit pin, the authentication may consist of selecting two keys 214 (as the first two digits of a pin) of a first virtual keyboard 212 and other two keys 214 (as the two last digits of a pin) of a second virtual keyboard 212, wherein said first and second virtual keyboard(s) may be represented at once or sequentially one after another (in the latter case the authentication will consist of two successive steps in which two different instances of the virtual keyboard 212 are used).

The authentication rules 152 allow a given particular result to be obtained given an instance of a virtual keyboard 212 generated according to the keyboard generation rules 118. The authentication rules 152 are individual for each user 201, and constitute the only secret that the user 201 has to learn. Depending on the desired complexity, the authentication rules 152 may be of various nature, such as:

- Choosing a key 214 or sequence of keys 214 based on one or more graphical features 114 or in the disposition 116 of the features or graphic features 114.
- Extraction of a feature or value of a chosen key 214.
- Modification/transformation of that feature or value in another.
- Reference of another key 214 based on the feature/value/position or other characteristics of the chosen key 214.

Next, one of the innumerable authentication rules sequences 152 that the user 201 may choose as authentication mechanism mode is exemplified, using, for example, the virtual keyboard 212 of FIG. 4J:

- Choosing the key 214 including the graphical feature 114 of the number 5, and annotating the vowel containing (in the example of FIG. 4J, the selected key 214 is the key of the first row and first column, and the selected vowel is the "I").
- Choosing as a first result the other key 214 of the virtual keyboard 212 containing the graphic feature 114 of the same vowel (in the example, the other key 201 containing the vowel "I" is the key with the numerical feature '8' located in the down row, fourth column).
- Choosing the key 214 of the opposite row whose number is blue (in this case, the opposite row is the top row, and the top row key containing a blue number is the fifth column key 214, with the number "2" in blue). The colours of the letters and numbers on the virtual keyboard 212 of FIG. 4J coincides with the colours illustrated in FIG. 4A using different types of scratching.
- Choosing the key 214 of the opposite row and same column (i.e., lower row and fifth column, the key with the number "6"), extracting the consonant located in the lower hole of the key (the "Z") and calculating the next letter (thus obtaining the vowel "A").
- Choosing as a second result the key 214 with this latter letter (the key with the vowel "A" is the key with the number "1" found in the upper row, fourth column).
- Selecting the first result and the second result (in this example, the user enters the key "8" and then the key "1"). The result may be introduced, for example, by sequential pulsing of such keys, in the event that the virtual keyboard 212 is depicted on a touch screen. Alternatively, the result may be introduced by other types of interfaces (e.g, a physical keyboard, a voice command, etc.).

In this example of authentication process, the user 201 is to choose a pair of keys 214 resulting from the virtual keyboard instance 212 generated for such purpose. External elements may be included in the authentication rules 152, such as the day of the month and the first two letters of the city where authentication is performed. Thus, in the event that the authentication is performed on day 24 of the month from Madrid ("MA"), the following rules are arranged:

- Choosing as a first result the key 214 that includes the first occurrence of the first letter of the city (in the example, the consonant "M") on the right of the key 214. If the key with the consonant "M" appear to be in the fifth column, then the result key will be located in the first column of the same row of the virtual keyboard 212. Using, for example, the keyboard of FIG. 4J, the key chosen would be the key "6", as the key located on the right of the key "8" containing the consonant "M".
- Choosing as a second result the key 214 with the first occurrence of the second letter of the city (in the example, the "A") located on the right of the key 214, where the virtual keyboard 212 is followed from left to right and up to down. Using the keyboard of FIG. 4J the key chosen would be key "2", as it is the key located on the right of key "1" containing the first occurrence of the vowel "A".

Introducing consecutively the first result and the second result.

The authentication rules 152 may increase in complexity, based on other external elements such as part of the service identifier where the authentication process occurs; incorporation of OTP messages specific to that authentication process; more complex mathematical calculations (multiplications, modules, exponentiation, etc.); more complex position transforms such as horse movement; logical comparisons (e.g, if the arrangement of the first "E" is on the left, choosing the value 7, and if it is on the right choosing the value 4, or depending on the even/odd value of the numerical feature of a certain key), transforms between letters, numerical values and positions (if it is "A" add 1, if it is "E" add 2, etc.).

Figure 5:
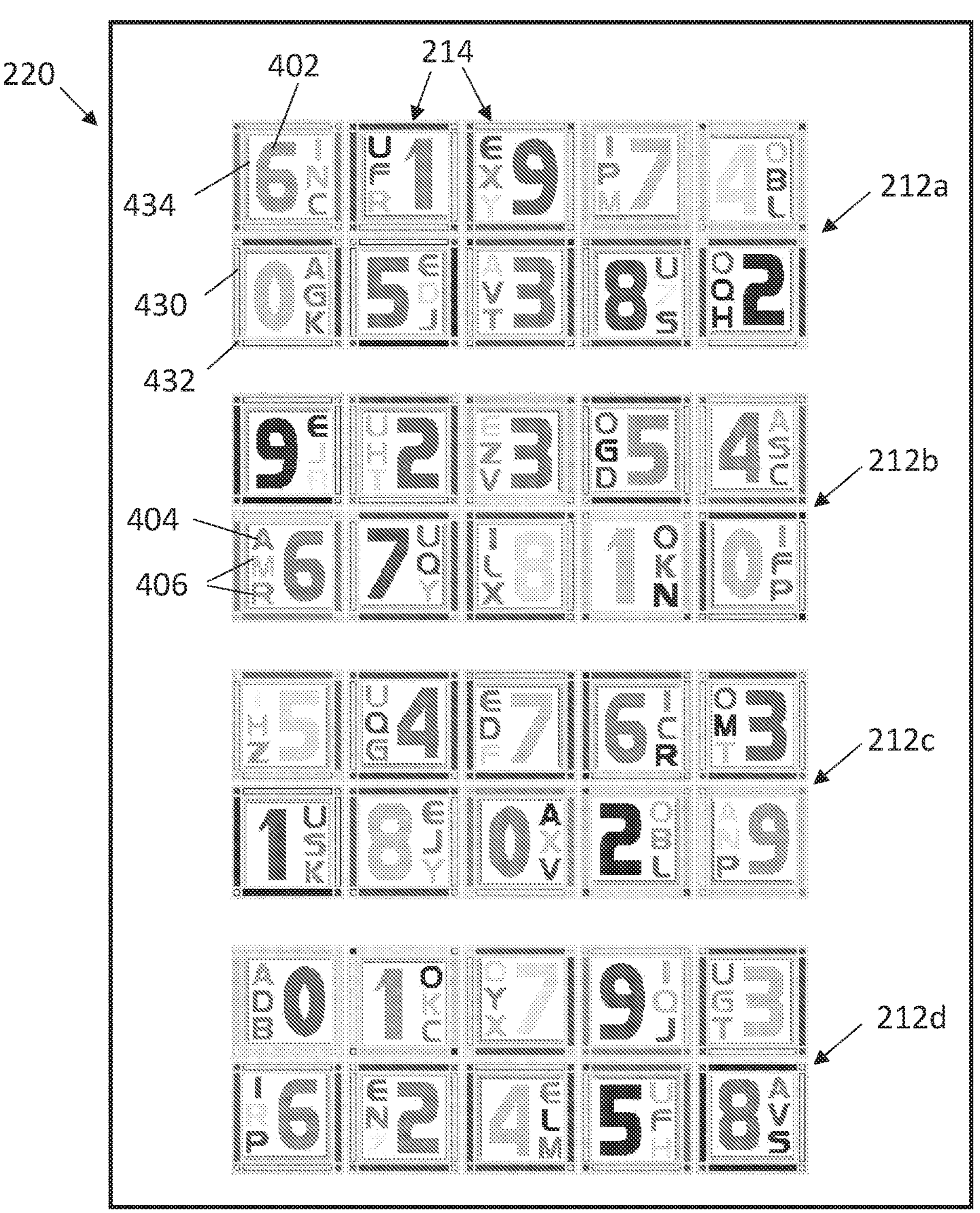
FIG. 5 shows an authentication process using four virtual keyboards.

In authentication rules 152, the result may include selecting a single key or multiple keys (e.g four keys). In the event that the result includes a number of selected keys, the order of selection of the keys performed by the user 201 may be relevant to the authentication or not, based on the authentication configuration. For example, if a user follows the authentication rules 152 and the results is the keys "2", "8" and "5", the result of the authentication 242 may be considered positive in the event that the user enters the keys in that same order dictated by the authentication rules 152, and not in another order. Alternatively, it could be allowed to introduce the keys in any other order (e.g. "2", "5", "8"). An authentication process is shown in FIG. 5 using four virtual keyboard (212*a*, 212*b*, 212*c*, 212*d*) generated by the virtual keyboard generation unit 210. The virtual keyboards may be displayed in different ways; for example: one keyboard after another (such that for each virtual keyboard represented by the user chooses one or more keys 214 as a result), or a number of virtual keyboards 212 may be displayed at a time (e.g, all virtual keyboards are shown, and the user has to choose one or more keys 214 as a result using certain authentication rules 152).

Each of the four virtual keyboards (212*a*, 212*b*, 212*c*, 212*d*) have been generated according to the following keyboard generation rules 118, similar to those used for FIG. 4I:

- Each virtual keyboard is formed by ten keys 214 arranged in five columns and two rows, using a ten-colour palette (blue, cyan, yellow, green, mint, red, pink, orange, purple, and grey), for a security configuration of 108 (equivalent to an 8 cipher-pin) introduced two in two.
- Each key 214 is composed of:
  - A central element, formed by a number 402 occupying two thirds horizontally, and a vowel 404 and two consonants 406 in a vertical direction occupying the third horizontal third.
  - On the virtual keyboard the number 402 is disposed five times on the left and others five times the number 402 is disposed on the right. The vowel 404 is disposed in the upper place, reserving the other two places (middle and lower) for the consonants 406.
  - An edge element, which in turn contains two different graphic features: four side edges 430 and four vertices 432 or corners.
- The location of the central element is determined by a graphical position feature, of ten variations illustrated by thin edges 434 around the central element (top, bottom, right, left, each of the four corners, centred, and enlarged—i.e. with no fine edges 434). For example, denoted each key 214 by the numerical value showing, in the first virtual keyboard 212*a* of FIG. 5, the key "3" has a central variation, by having four fine edges 434; the key "9" has an extended variation, by not having fine edges 434; the key "6" has a right variation, by not having fine edges 434 on the right side; the key "1" has an up-right variation, by not having thin edges 434 above and to the right and top sides.
- The graphical feature of the four side edges 430 of each key 214 is coloured from one of the ten available colours.
- The graphical feature of the four side edges 430 of each key 214 has a coloured pattern of ten possible variations, a different one in each key 214:
  - Four variations in "C", with the opening facing up (e.g, Key 4 of the first virtual keyboard 212*a*), below (e.g, Key 2 of the first virtual keyboard 212*a*), right (e.g, Key 7 of the first virtual keyboard 212*a*) and left (e.g, Key 3 of the first virtual keyboard 212*a*).
  - Four variations in "L" pointing for each of the four corners (e.g, keys "1", "9", "0" and "5" of the first virtual keyboard 212*a*).
  - Coloured only the vertical side edges 430 (e.g key 6 of the first virtual keyboard 212*a*).
  - Coloured only the horizontal side edges 430 (e.g, key 8 of the first virtual keyboard 212*a*).
- The graphical feature of the four vertices 432 of each key 214 is coloured from one of the ten available colours.
- The graphical feature of the four vertex 432 of each key 214 shows a coloured pattern of the ten possible variations, a different one in each key 214:
  - Three coloured vertices 432 leaving the fourth vertex uncoloured, at each of the corners.
  - Two vertices 432 coloured above, below, right and left.
  - Two vertices 432 coloured at diametrically opposed corners.
- In each key 214, a non-repeated number 402 of the set of the first ten natural numbers is included; while, each of the numbers 402 is coloured from one of the ten possible colours.
- On each virtual keyboard each of the five vowels 404 is shown randomly in the right column, and likewise in the left column. Each vowel is coloured from each of the ten randomly available colours.
- There are 20 different consonant features 406 (this is, 20 different consonants are used), which are randomly distributed between the 20 available places in the ten keys 214. The centrally located consonant features 406 are coloured from each of the 10 randomly available colours. Likewise, the consonants 406 located in the lower place are randomly coloured from each of the 10 available colours.

With this configuration, the operation of choice of one or more keys for the authentication process may be defined, among other variables:

- By the position of the key 214.
- By the colour of the four vertices 432, of the four side edges 430, of the numerical cipher 402, the vowel 404, the mid-consonant 406, or lower-consonant 406.
- By the coloured pattern of the four vertices 432 or the four side edges 430.
- By vowel 404 and it's right or left arrangement.
- By a consonant 406.
- By the value of the number 402 of the key 214.

This operation of key choice may be combined with an extraction operation (e.g of key X extracting the value of the feature Y) like: modification, transformation, and reference, among others, to forming a key selection 144 as a first user input 142, where the key selection 144 may include any number of selected keys, depending on the configuration (e.g, a selected key, two selected keys, etc.).

Some of the possible authentication rules 152 of the user 201 would be:

Choosing the two keys 214 of the virtual keyboard 212 that include the vowel "A".

Extract their numerical values (where 0 is interpreted as 10).

Multiply these values.

Add the value of the number 402 shown in cyan on the virtual keyboard 212.

As a result, choosing the keys 214 to the right of each cipher of this result (considering as the right of the key located in the fifth column, to be the key of the first column of the same row).

Applying these authentication rules to the four virtual keyboard (212*a*, 212*b*, 212*c*, 212*d*) of FIG. 5 will be obtained:

For the first virtual keyboard 212*a* (identifying the keys by their numerical value):

The keys with "A" are the "0" and "3", which multiplied result in 30.

The number in cyan colour 402 is the "6", which summed to 30 results 36.

The keys chosen as a result are those located on the right of each cipher "3" and "6" that is, the keys "8" and "1", respectively.

For the second virtual keyboard 212*b:*

The keys with "A" are the "4" and "6", which multiplied result in 24.

The number in cyan colour 402 is the "5", which summed to 24 results 29.

The keys chosen as a result are those located on the right of each cipher "2" and "9" that is, the keys "3" and "2", respectively.

For the third virtual keyboard 212*c:*

The keys with "A" are the "0" and "9", which multiplied result in 90 ("0" is considered to value as 10).

The number in cyan colour 402 is the "9", which summed to 90 results 99.

The keys chosen as a result are those located on the right of each cipher "9" and "9" that is, the key "1" to be selected two times.

For the fourth virtual keyboard 212*d:*

The keys with "A" are the "0" and "8", which multiplied result in 80.

The number in cyan colour 402 is the "1", which summed to 80 results 81.

The keys chosen as a result are those located on the right of each cipher "8" and "1" that is, the keys "6" and "7", respectively.

Thus, forming the final result the value "81321167". This result may be introduced in multiple forms; for example, by voice or keyboard. In the event that a touch screen 220 is employed to represent the virtual keyboards, as illustrated in the example of FIG. 5, the user 201 may be expressed to input the key selection 144 from each virtual keyboard (212*a*, 212*b*, 212*c*, 212*d*) by pulsing the selected keys on each virtual keyboard. Advantageously, the graphical representation of the virtual keyboards 212 may be employed as a user input means for authentication, not requiring additional input means (such as a physical keyboard or an additional graphical interface).

The authentication process of the present invention may be considered to be mutual authentication method, since on one hand, the authentication system 240 is responsible for authenticating the user 201, but in turn, the user 201 is able to authenticate the authentication system, as the user 201 knows not only the authentication rules 152, but the graphical features 114 and arrangements 116 that the virtual keyboards 212 may adopt, as well as the keyboard generation rules 118 employed (in fact, the user 201 has been able to intervene throughout the virtual keyboard configuration process, or even creating new graphical features than those proposed by the system). Thus, if a computer system is to impersonate the authorized authentication system, the user 201 will be able to detect this fraudulent situation by checking that the displayed virtual keyboards 212 do not correspond to the graphical features 114, the arrangements 116 or the keyboard generation rules 118 previously adopted in the keyboard configuration 112 for the user 201. To perform such an attack, the attacker should reproduce in detail the keyboard generation rules 118, which would have been saved in a secure location (e.g, on a server). The keyboard generation rules 118 may even consider external elements (such as the day of the month, such that on odd days, one type of graphic features 114 and arrangements 116 are employed, and on the even days, another different set). In this way, the authentication process of a user performed in the present invention adds an additional security layer since it allows the user to authenticate the authentication system itself (i.e., it checks that the authentication system is not an impostor).

The authentication process of the present invention may be employed in any application in which it is required to authenticate a user, such as, without limitation:

Access to an application or a web page.

Method for unlocking an electronic device (e.g a smartphone), where the virtual keyboard generation unit 210 and the authentication unit 240 are both inside the device itself (either in memory, dedicated chip, etc.).

Method for unlocking an encrypted compressed-coded file (similar to the unlocking of a device but at the level of software, where the key pad is somewhat self-contained in the file).

Authentication with progressive levels of security in an app (e.g, a bank app where to access a pair of virtual keyboards, and to confirm the handover operation to resolve another or other virtual keyboard(s).

Use of ATMs, payments at a point-of-sale terminal (POS), where the authentication validates a particular payment operation.

Access Control (e.g, a high security access control door to a building).

Use as a captcha mechanism, as it can function like a verbal instruction of easy comprehension, but complicated for a machine to automatically perform.

As a session token (if a unique pair keyboard-solution is used, it may be used as a session token by forming a unique key with a substantially negligible collision risk).

The invention claimed is:

1. The invention relates to a mutual authentication method, comprising:

obtaining (110) a keyboard configuration (112) of a user (201) to be authenticated, wherein the keyboard configuration (112) includes:

a plurality of graphical features (114); wherein the graphical features (114) include numbers, and/or letters, a plurality of arrangements (116) of the graphical features (114), and keyboard generation rules (118);

generating (120) at least one virtual keyboard (212), wherein each virtual keyboard (212) is formed by a plurality of keys (214), incorporating in each key (214) a combination of multiple graphical features (114) arranged in certain arrangements (116) based on the keyboard generation rules (118);

show (130) the at least one virtual keyboard (212) to the user;

receiving (140) a first user input (142) corresponding to a key selection (144) from the at least one virtual keyboard (212), wherein the key selection (144) comprises a sequence of keys (214) having multiple graphical features (114) arranged in certain arrangements (116) on each key (214), and wherein the key selection (144) meets authentication rules (152) related to the graphical features (114) and arrangements (116);

obtain (150) the authentication rules (152) for the user (201);

applying (160) the authentication rules (152) of the user (201) over the at least one virtual keyboard (212) with respect to the first user input (142); and authenticate (170) the user (201) if the key selection (144) of the first user input (142) is validated with respect to a correct key sequence (162).

2. The method of claim 1, comprising obtaining (102) an identification (204) of the user (201) to authenticate prior to obtaining (110) the keyboard configuration (112).

3. The method according to claim 1, comprising obtaining (104) a second user input (106), and wherein at least one virtual keyboard (212) is generated based on the keyboard generation rules (118) in combination with the said second user input (106).

4. The method according to claim 1, wherein the at least one virtual keyboard (212) is shown (130) on at least one display (220).

5. The method of claim 4, wherein the at least one display (220) is touch-enabled and wherein the key selection (144) is performed by pulsing the selected keys (214) of each virtual keyboard (212) shown in the at least one touch screen (220).

6. The method according to claim 1, wherein the keyboard configuration (112) of the user (201) is obtained by accessing a database (211) or a memory (213).

7. The method according to claim 1, wherein the authentication rules (152) of the user (201) are obtained by accessing a database (241) or a memory (243).

8. The method according to claim 1, wherein by applying the authentication rules (152) of the user (201) over the at least one virtual keyboard (212) a plurality of correct key sequences (162) are obtained.

9. The method of claim 8, wherein the user authentication (201) comprises different authentication levels, based on the correct key sequence (162) with respect to which the key selection (144) is validated.

10. The method according to claim 8, comprising identifying the user among a set of users, based on the correct key sequence (162) with respect to which the key selection (144) is validated.

11. The method according to claim 1, wherein the arrangements (116) of the graphical features (114) in each key (214) define the position and/or orientation of the graphical feature (114) within the key (214).

12. The method according to claim 1, wherein the graphical features (114) are formed by:

main features, which define the shape of the graphic feature (114), and secondary features, which define a feature of the main features.

13. A computer-readable non-transitory storage medium, comprising program instructions stored on the said storage, so, when executed in a processor, cause the processor to carry out the method of claim 1.

14. A mutual authentication system, comprising:

one or more electronic devices having processors that execute logic units including a user identification unit (202), a virtual keyboard generation unit (210) and an authentication unit (240);

the virtual keyboard generation unit (210) is configured for:

obtaining (110) a keyboard configuration (112) of a user (201) to be authenticated, wherein the keyboard configuration (112) includes:

a plurality of graphical features (114), wherein the graphical features (114) include numbers and/or letters, a plurality of arrangements (116) of the graphical features (114), and keyboard generation rules (118); and generating (120) at least one virtual keyboard (212), wherein each virtual keyboard (212) is formed by a plurality of keys (214) incorporating on each key (214) a combination of multiple graphical features (114) arranged in certain arrangements (116) based on the keyboard generation rules (118);

an input interface (230) configured to receive (140) a first user input (142) corresponding to a key selection (144) from the at least one virtual keyboard (212), wherein the key selection (144) comprises a sequence of keys (214) having multiple graphical features (114) arranged in certain arrangements (116) on each key (214), and wherein the key selection (144) meets authentication rules (152) related to the graphical features (114) and arrangements (116); and the authentication unit (240) configured for:

obtaining (150) the authentication rules (152) (201);

applying (160) the authentication rules (152) of the user (201) over the at least one virtual keyboard (212) with respect to the first user input (142); and authenticating (170) the user (201) if the key selection (144) of the first user input (142) is validated with respect to a correct key sequence (162).

15. The system according to claim 14, wherein the user identification unit (202) is configured to obtain (102) an identification (204) of the user (201) to be authenticated.

16. The system according to claim 14, wherein the input interface (230) is configured to obtain (104) a second user input (106), and wherein the virtual keyboard generation unit (210) is configured to generate at least one virtual keyboard (212) based on the keyboard generation rules (118) in combination with said second user input (106).

17. The system according to claim 14, further comprising an information representation device configured to display (130) the at least one virtual keyboard (212).

18. The system according to claim 17, wherein the device for information representation comprises at least one touch screen (220), the input interface (230) comprising at least one touch screen (220), and the key selection (144) is performed by the user (201) by pulsing the keys (214) to be selected from each displayed virtual keyboard (212).

19. The system according to claim 14, wherein the virtual keyboard generation unit (210) is configured to obtain (110) the keyboard configuration (112) of the user (201) by accessing an external database (211) or an internal memory (213).

20. The system according to claim 14, wherein the authentication unit (240) is configured to obtain the authentication rules (152) of the user (201) by accessing an external database (241) or an internal memory (243).

21. The system according to claim 14, wherein the authentication unit (240) is configured to obtain a plurality of correct key sequences (162) by applying the authentication rules (152) of the user (201) over the at least one virtual keyboard (212).

22. The system according to claim 21, wherein the authentication unit (240) is configured to authenticate the user (201) based on different authentication levels, based on the correct key sequence (162) with respect to which the key selection (144) is validated.

23. The system according to claim 21, wherein the authentication unit (240) is configured to identify the user between a set of users, based on the correct key sequence (162) with respect to which the key selection (144) is validated.

24. The system according to claim 14, wherein elements of the system are built as part of a same electronic device.

25. The system according to claim 14, wherein elements of the system are distributed in different electronic devices.

* * * * *